US008700910B2

(12) United States Patent
Tadokoro

(10) Patent No.: US 8,700,910 B2
(45) Date of Patent: Apr. 15, 2014

(54) COMMUNICATION SYSTEM AND AUTHENTICATION CARD

(75) Inventor: Asami Tadokoro, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 1300 days.

(21) Appl. No.: 11/914,973

(22) PCT Filed: May 29, 2006

(86) PCT No.: PCT/JP2006/311141
§ 371 (c)(1),
(2), (4) Date: Nov. 20, 2007

(87) PCT Pub. No.: WO2006/129816
PCT Pub. Date: Dec. 7, 2006

(65) Prior Publication Data
US 2009/0100265 A1    Apr. 16, 2009

(30) Foreign Application Priority Data
May 31, 2005    (JP) .................................. 2005-158301

(51) Int. Cl.
H04L 29/06    (2006.01)
G06F 21/32    (2013.01)
G06F 21/34    (2013.01)

(52) U.S. Cl.
CPC ..................... G06F 21/32 (2013.01);
G06F 21/34 (2013.01);
H04L 63/0853 (2013.01);
H04L 63/0861 (2013.01)
USPC ............................. 713/186; 713/184; 713/172

(58) Field of Classification Search
CPC . H04L 63/0861; H04L 63/0853; G06F 21/32; G06F 21/34
USPC .................... 713/172, 184, 185, 186
See application file for complete search history.

(56) References Cited

U.S. PATENT DOCUMENTS 5,953,422 A * 9/1999 Angelo et al. ................ 713/185
6,400,823 B1 * 6/2002 Angelo .......................... 380/255
(Continued)

FOREIGN PATENT DOCUMENTS

EP    0 846 786 A2    6/1998
JP    62-66376    3/1987
(Continued)

OTHER PUBLICATIONS

International Search Report re application No. PCT/JP2006/311141, dated Sep. 26, 2006.
(Continued)

Primary Examiner — David García Cervetti
(74) Attorney, Agent, or Firm — Husch Blackwell LLP

(57) ABSTRACT

One of the objects of the present invention is to provide a communication system in which biometrics can be utilized without leaking to a third person so that a strict personal authentication can be conducted. The communication system includes, storing a correspondence table in a card, storing a reference password which is formed by converting a part of biometrics of an authorized user in the card by using the correspondence table, reading a part of biometrics of a user by the card, converting a part of the biometrics of the user into a password by the card using the correspondence table, and checking the password against the reference password by the card, wherein the card and the user are authenticated if a the password and the reference password match in the step of checking.

16 Claims, 20 Drawing Sheets

(56) References Cited

U.S. PATENT DOCUMENTS

| | | | |
|---|---|---|---|
| 6,523,745 B1* | 2/2003 | Tamori | 235/382 |
| 6,782,120 B2* | 8/2004 | Modl et al. | 382/124 |
| 6,825,488 B2 | 11/2004 | Yamazaki et al. | |
| 6,980,673 B2* | 12/2005 | Funahashi | 382/124 |
| 7,043,754 B2* | 5/2006 | Arnouse | 726/20 |
| 7,091,826 B2* | 8/2006 | Hayakawa | 340/5.82 |
| 7,679,131 B1 | 3/2010 | Kawasaki et al. | |
| 7,799,590 B2 | 9/2010 | Yamazaki et al. | |
| 8,017,456 B2 | 9/2011 | Yamazaki et al. | |
| 2002/0095588 A1* | 7/2002 | Shigematsu et al. | 713/186 |
| 2002/0126882 A1* | 9/2002 | Funahashi | 382/124 |
| 2003/0156011 A1* | 8/2003 | Modl et al. | 340/5.82 |
| 2004/0025031 A1* | 2/2004 | Ooi et al. | 713/186 |
| 2004/0044896 A1* | 3/2004 | Kelley et al. | 713/183 |
| 2004/0129787 A1* | 7/2004 | Saito et al. | 235/492 |
| 2005/0108552 A1* | 5/2005 | Gelbord et al. | 713/186 |
| 2005/0246763 A1* | 11/2005 | Corcoran et al. | 726/3 |
| 2006/0107067 A1* | 5/2006 | Safal et al. | 713/186 |

FOREIGN PATENT DOCUMENTS

| | | |
|---|---|---|
| JP | 1-213764 | 8/1989 |
| JP | 5-34718 | 2/1993 |
| JP | 5-300144 | 11/1993 |
| JP | 10-219441 | 8/1998 |
| JP | 11-134302 | 5/1999 |
| JP | 11-149453 | 6/1999 |
| JP | 2000-259820 | 9/2000 |
| JP | 2001-144302 | 5/2001 |
| JP | 2001-281704 | 10/2001 |
| JP | 2002-269050 | 9/2002 |
| JP | 2003-30153 | 1/2003 |
| JP | 2003-242464 | 8/2003 |
| WO | WO 2004/015515 A2 | 2/2004 |
| WO | WO 2004/015579 A1 | 2/2004 |
| WO | WO 2004/025545 A2 | 3/2004 |

OTHER PUBLICATIONS

Written Opinion re application No. PCT/JP2006/311141, dated Sep. 26, 2006.

Suto, H., "Fingerprint Verification Token System," NTT Technical Journal, The Telecommunications Association, vol. 15, No. 12, Dec. 1, 2003, pp. 53-46 (in Japanese).

Suto, H. et al, "Compact Fingerprint Verification Device: Finger Token," NTT Technical Review, vol. 2, No. 2, Feb. 2004, pp. 65-69.

Office Action re Japanese application No. JP 2006-148425, dated Sep. 13, 2011 (with English translation).

Suto, H., "Fingerprint Verification Token System," NTT Technical Journal, The Telecommunications Association, vol. 15, No. 12, Dec. 1, 2003, pp. 43-46 (in Japanese).

* cited by examiner

COMMUNICATION SYSTEM AND AUTHENTICATION CARD

TECHNICAL FIELD

The present invention relates to a communication system. In particular, the present invention relates to a communication system using an ID card with a personal authentication function.

BACKGROUND ART

In recent years, a magnetic card which incorporates an IC for wireless communication by an electromagnetic wave or the like has been used for an entry management system or an accounting system which utilizes electronic money or the like.

FIG. 18 shows a conventional system for personal authentication using a password. A user 21 holds an ID card 22 near a terminal 23 so that the ID card 22 is read. Then, the user 21 inputs a password to the terminal 23. Then a management server 24 conducts a check 25 of the password against data for a check 26, which the user 21 has registered in advance. When they match, the ID card identifies the user 21 as an authorized user and transmits the information. Thus, with the conventional system, data for a check is stored in the management server, therefore two-way communication between the terminal and the management server is conducted.

Details of the system are described with reference to a flow chart of personal authentication in an entry management system shown in FIG. 19. When a user holds an ID card near a reader terminal placed near a door (30), the ID card receives an electromagnetic wave transmitted from an authentication server 37 through the reader terminal and starts operation. The ID cards receives a signal of ID number requirement 31 and transmits (32) the ID number stored in the ID card to the authentication server through the reader terminal. Then, the authentication server identifies (33) the ID number stored in advance and provides a password corresponding to the ID number as data for a check. At the same time, the authentication server requires the user to input a password (34). When the user inputs a password using a key board or the like provided for the reader terminal (35), the authentication server conducts a check 36 of the inputted password against the password which has been stored in advance. When the passwords match (38), the user is identified as the authorized user and the door is unlocked (39). On the other hand, when the passwords do not match (40), the user is not identified as the authorized user and the door remains locked. The steps of 38, 39 and 40 are identified as authentication steps 49. In an entry management system with lower security, a password is not required to be inputted and a user is authenticated or not authenticated only by identifying an ID number.

As described above, in a conventional personal authentication system, a user holding an ID card is identified as an authorized user by a check of a name of the user, an ID number such as a personal authentication number, a password, and the like.

However, a person holding an ID card is not always the authorized user registered in the ID card. That is, when the genuine ID card is used, using the ID card by deputy or spoofing can be conducted. To judge the person holding the ID card is the authorized user registered in the ID card, many kinds of techniques for personal authentication by checking a biological feature (biometrics) (for example, see Patent Document 1) have been suggested.

[Patent Document 1] Japanese Patent Laid-Open No. 2002-269050

DISCLOSURE OF INVENTION

However, in a system shown in FIGS. 18 and 19, there is a problem in that an unauthorized use by a system manager cannot be prevented since the management server manages a password and the like. To solve the problem, there is a method in which the password may be encrypted by a manager to be stored, and then decrypted as required. However, even if this method is employed, information required for decryption is stored in the management server; therefore, there remains a problem in that the unauthorized use by the system manager cannot be prevented.

In addition, there is another problem in that biometrics itself is difficult to be used as data for a check. A system in which a person is identified with a use of biometrics is explained with reference to FIG. 20. For example, when two people talk on a portable phone, a person (50) pushes an operation button (51) first. Then, a sensor starts operation for sampling (41) the biometrics. The sampled biometrics is verified (44) with the biometrics registered in a memory device provided in the portable phone in advance. When they match (43), an authentication-complete signal is transmitted (45) to the other person (52) and the authentication is completed (48). Then the person receives (46) the authentication-complete signal and conversation is started (call start 47). If they do not match (49) in the check (44), biometrics is sampled again. The steps of 43, 44 and 49 are identified as authentication steps 53. Alternatively, the other person is informed that the authentication is failed.

However, as biometrics is processed as two dimensional pattern data, an amount of information is extremely large. Therefore, a memory device having large capacity is required to store biometrics as data for a check. In addition, as biometrics can uniquely specify an individual, a social backlash is inevitable; therefore, biometrics is difficult to be handled as data for a check as it is.

Thus, in a portable phone, authentication is conducted only by a user and the other person is informed that authentication is completed in a form of data. However, when authentication is conducted by a portable phone, there is a problem that the biometrics is stored in the portable phone which is a terminal. Besides, when a battery of the portable phone runs out, other functions in addition to authentication cannot be used.

In addition, there is a system using a multichip IC card so that the system has a plurality of functions. Since there are different security or communication protocols depending on a plurality of usage, functions cannot be put together in one chip. Therefore, a plurality of chips is mounted in one card.

However, in a case where a plurality of chips (chips using semiconductor substrates) is used in one card, a master chip which selects and controls each chip as required is needed and the master chip needs to be developed depending on the chips combined. In addition, the number of components mounted in the card increases, which leads to a problem in that high cost is needed compared to a card provided with one chip.

It is one of the objects of the present invention to solve the foregoing problem.

To achieve the foregoing object, in the present invention, authentication is confirmed with an ID card itself provided with a sensor for personal authentication. In that case, a password converted from the biometrics is used. When authentication is confirmed in the ID card, the ID card informs the management server that the authentication is completed.

The foregoing system is explained with reference to FIG. 1.

The user 11 puts the ID card 12 (also simply referred to as a card or an authentication card) close to a terminal 13 while holding biometrics to a sensor mounted in the ID card 12. Then, power is supplied to the ID card 12 by communication with the terminal 13 and the biometrics is sampled (15). A password is generated from the sampled biometrics and the generated password and a reference password (data for a check 17) which has been registered in advance in the ID card are checked against each other (16).

When the password and the reference password Match in the check, the ID card 12 transmits a signal to the management server 14 through the terminal 13 to inform that the user 11 is the authorized user.

When the password and the reference password do not match in the check, the ID card transmits a signal to the management server 14 through the terminal 13 to inform that the user 11 is not the authorized user or the ID card 12 does not transmit a signal to the terminal 13.

A communication system of the present invention is a communication system for identifying a user, comprising a step of storing a correspondence table in a card, a step of storing a reference password which is formed by converting biometrics of an authorized user in the card by using the correspondence table, a step of reading biometrics of a user by the card, a step of converting the biometrics of the user into a password by the card and using the correspondence table, and a step of checking the password against the reference password by the card, wherein the card and the user are authenticated if the password and the reference password match in the step of checking.

A communication system of the present invention is a communication system for identifying a user, comprising a step of storing a correspondence table in a card, a step of storing a reference password which is formed by converting biometrics of an authorized user in the card by using the correspondence table, a step of reading biometrics of a user by the card using power supplied by communication between the card and a terminal, a step of converting the biometrics of the user into a password by the card using the correspondence table, and a step of checking the password against the reference password by the card, wherein the card and the user are authenticated if the password and the reference password match in the step of checking.

A communication system of the present invention is a communication system for identifying a user, comprising a step of storing a correspondence table in a card, a step of storing a reference password which is formed by converting biometrics of an authorized user in the card by using the correspondence table, a step of reading biometrics of a user by the card, a step of converting the biometrics of the user into a password by the card using the correspondence table, a step of checking the password against the reference password by the card, and a step of transmitting authentication data of the user if the password and the reference password match in the step of checking.

A communication system of the present invention is a communication system for identifying a user, comprising a step of storing a correspondence table in a card, a step of storing a reference password which is formed by converting biometrics of an authorized user in the card by using the correspondence table, a step of reading biometrics of a user by the card using power supplied by communication between the card and a terminal, a step of converting the biometrics of the user into a password by the card using the correspondence table, a step of checking the password against the reference password by the card, and a step of transmitting authentication data of the user to the terminal if the password and the reference password match in the step of checking.

A communication system of the present invention is a communication system for identifying a user, comprising a step of storing a correspondence table in a card, a step of storing a reference password which is formed by converting biometrics of an authorized user in the card by using the correspondence table, a step of reading biometrics of a user by the card using power supplied by communication between the card and a terminal, a step of converting the biometrics of the user into a password by the card using the correspondence table, a step of checking the password against the reference password by the card, and a step of transmitting authentication data of the user to the terminal if the password and the reference password match in the step of checking, wherein after the authentication data of the user is received by the terminal, communication between the user and the server starts through the terminal.

A communication system of the present invention is a communication system for identifying a user by a card, comprising a step of storing a correspondence table in the card, a step of storing a reference password which is formed by converting biometrics of an authorized user in the card by using the correspondence table, a step of reading biometrics of a user by the card, a step of converting the biometrics of the user into a password by the card using the correspondence table; and, a step of checking the password against the reference password by the card, wherein the card does not transmit authentication data of the user if the password and the reference password do not match in the step of checking.

A communication system of the present invention is a communication system for identifying a user, comprising a step of storing a correspondence table in a card, a step of storing a reference password which is formed by converting biometrics of an authorized user in the card by using the correspondence table, a step of reading biometrics of a user by the card using power supplied by communication between the card and a terminal, a step of converting the biometrics of the user into a password by the card using the correspondence table, and a step of checking the password and the reference password by using the card, wherein the card does not transmit authentication data of the user to the terminal if the password and the reference password do not match in the step of checking.

In a communication system of the present invention, the step of reading biometrics of a user is conducted by a sensor provided in the card.

A communication system of the present invention is a communication system comprising a terminal, a management server, and an authentication card having a function of distinguishing a user, wherein the authentication card has a sensor for reading biometrics of the user, a function of storing a correspondence table for converting the biometrics read by the sensor into a password, a function of forming the password from the biometrics read by the sensor with reference to the correspondence table, a function of storing a password which is formed from biometrics of an authorized user as a reference password by the function of forming the password, a function of checking the password against the reference password, and a function of wirelessly transmitting information to the terminal which is connected to the management server.

In a communication system of the present invention, an authentication-complete signal is transmitted from an authentication card to a management server through a terminal if the password and the reference password match in the step of checking against each other. In addition, an authentication-incomplete signal is transmitted from the authentication card to the management server through the terminal if the password and the reference password do not match in the step of checking.

In a communication system of the present invention, information obtained from a hand is used as biometrics.

In a communication system of the present invention, information obtained from a fingerprint is used as biometrics.

In a communication system of the present invention, all steps up to a step of transmission to the management server can be conducted with power supplied by communication between a card and a terminal.

An authentication card of the present invention which identifies a user comprises a sensor for reading biometrics of the user, a function of storing a correspondence table for converting the biometrics read by the sensor into a password, a function of forming the password from the biometrics read by the sensor with reference to the correspondence table, a function of storing a password which is formed from biometrics of an authorized user as a reference password by the function of forming the password, a function of checking the password against the reference password, and a function of wirelessly transmitting information.

With the authentication card of the present invention, information obtained can be transmitted wirelessly if the password and the reference password match in the step of checking, while information cannot be transmitted wirelessly if the password and the reference password do not match in the step of checking.

In the authentication card according to the present invention, information obtained from a hand or fingerprint is used as biometrics.

According to the present invention, biometrics can be utilized without being leaked to a third person. Therefore, a personal authentication system which can conduct strict personal authentication can be provided.

In addition, according to the present invention, data for a check is managed by the registered person; therefore, the data for a check is not leaked when an unauthorized person intrudes into a management server.

In a case where the data for a check is stored in the management server, the data for a check is stored in a form of a random number which is encrypted with an encryption key generated from data sampled from the biometrics. Therefore, even when data for a check is leaked, a registered individual cannot be specified only with the data for a check. Therefore, when the ID card is stolen or lost, only changing the data for a check registered in the management server is required and biometrics itself is not required to be invalidated. Thus, security can be improved.

According to the present invention, programming of software to a central processing unit (CPU) can realize a case where a plurality of functions with different communication protocols is realized by one card. Therefore, a multifunction can be achieved without increasing the number of mounted components.

BEST MODE FOR CARRYING OUT THE INVENTION

Figure 1:
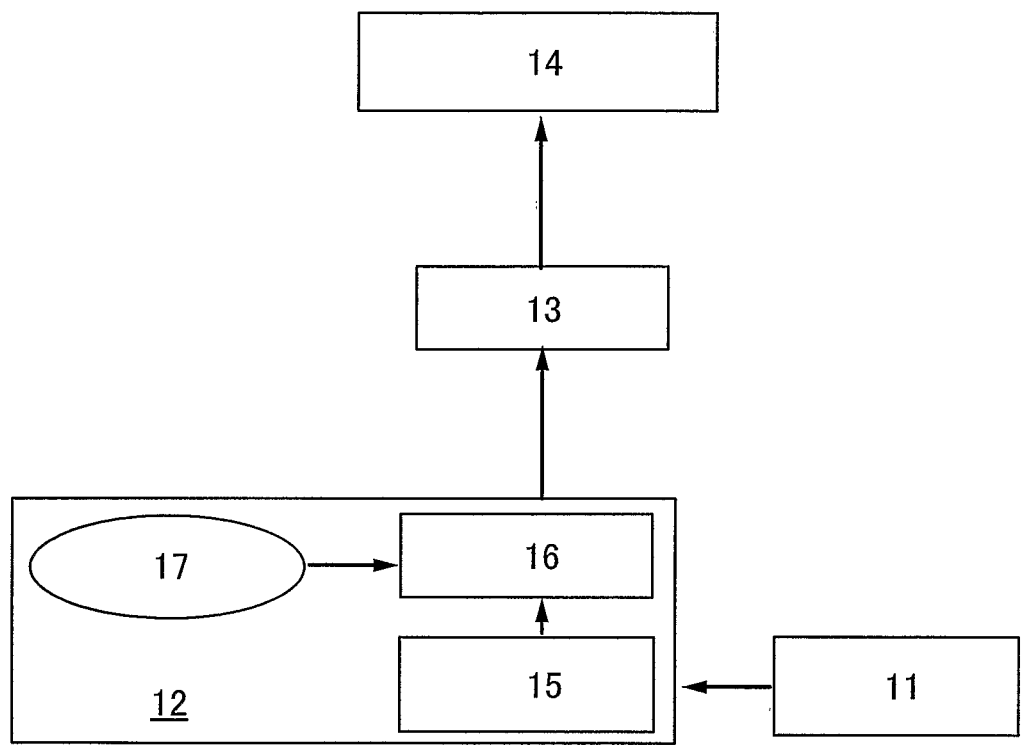
FIG. 1 is a flow chart of a communication system of the preset invention.

Hereinafter, the embodiment modes of the present invention will be described with reference to the accompanying drawings. The present invention can be carried out in many different modes, and it is easily understood by those skilled in the art that modes and details herein disclosed can be modified in various ways without departing from the purpose and the scope of the present invention. Accordingly, the present invention should not be interpreted as being limited to the description of the embodiment modes to be given below. Note that in the drawings, the same reference numerals are used for the same portions or the portions having the same functions and repeated description of the portions will be omitted.

Embodiment Mode 1

In this embodiment mode, a personal authentication system employing an ID card which utilizes a fingerprint as a biological feature (biometrics) is explained with reference to FIGS. 2 to 4, 5A to 5H, and 6.

Figure 2:
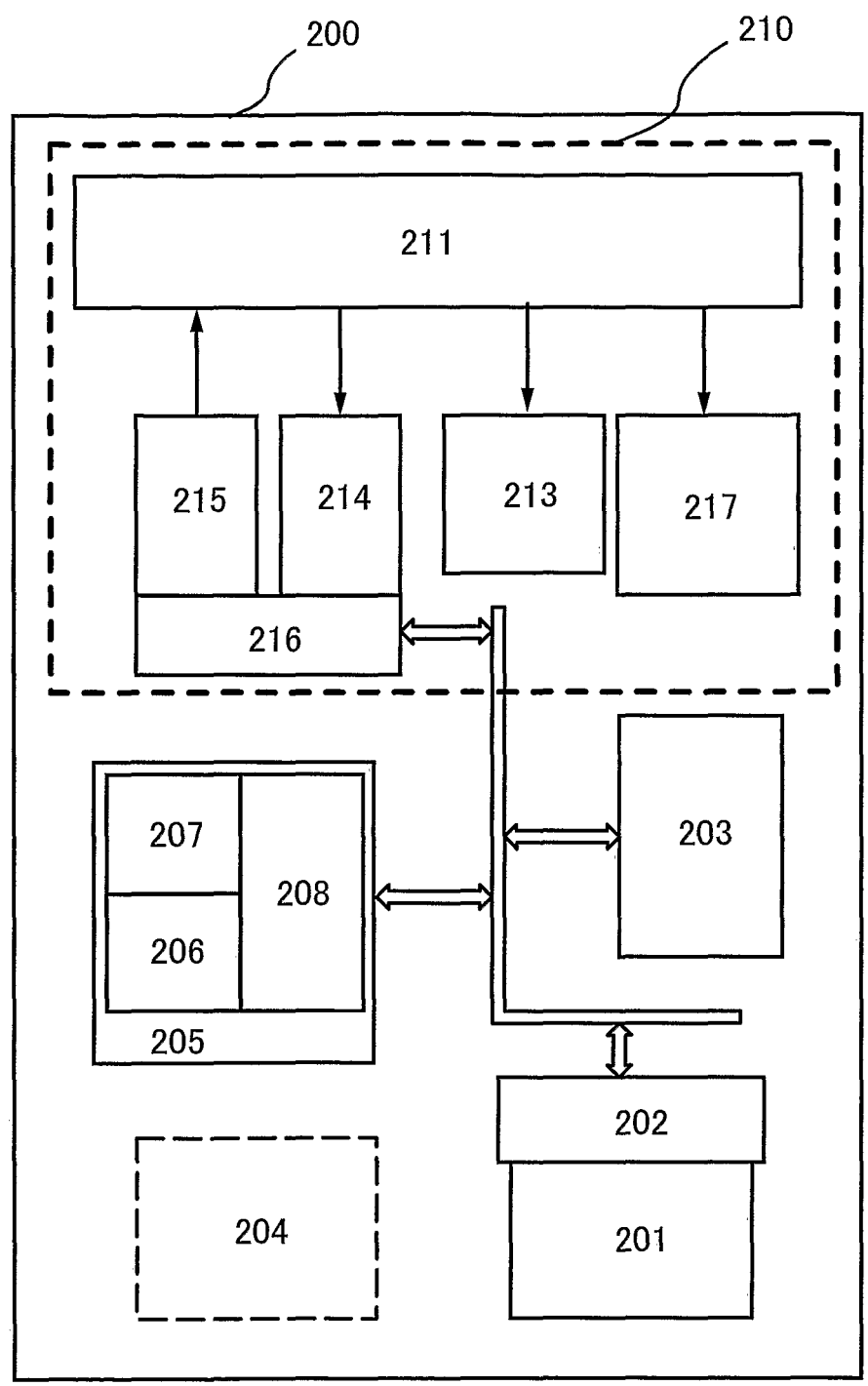
FIG. 2 is a block diagram of a structure of an ID card used for a communication system of the present invention.

FIG. 2 is a block diagram of a structural circuit of a semiconductor device of this embodiment mode. A card-shaped semiconductor device (hereinafter, referred to as an ID card 200) has an antenna 211 (also referred to as a resonance circuit) for transmitting and receiving an electromagnetic wave, a clock generation circuit 213 for obtaining a predetermined frequency from an electromagnetic wave, a demodulation circuit 214 for compressing and decompressing data, a modulation circuit 215 for encoding the compressed and decompressed data, an A/D converter circuit 216 for converting an externally transmitted electromagnetic wave into digital data, an electromagnetic wave transmitter/receiver part 210 having a power supply circuit 217 for generating power from the externally transmitted electromagnetic wave, a sensor 201 for reading biometrics, an A/D converter circuit 202 for converting sampled biometrics into digital image data, a nonvolatile memory device 203 (hereinafter, referred to as a memory), an encryption circuit 206 for encrypting data which is processed in the ID card 200, a decryption circuit 207 for decrypting data which is processed in the ID card 200, and a central processing unit (hereinafter, referred to as a CPU 205) for controlling the foregoing circuits. In the ID card 200, all of the foregoing circuits are formed over one plastic substrate.

Note that the ID card 200 of this embodiment mode may have an auxiliary power unit 204 such as a button-shaped battery and a solar cell film in addition to the foregoing components.

Next, each functional block is explained.

In this embodiment mode, a fingerprint is detected by utilizing a phenomenon that when irradiation or scanning of light to a pad of a finger is conducted, a ridge and a valley line on a finger reflect light to different directions.

A fingerprint reading sensor 201 has a light source which uses a self-light emitting element such as an organic EL (Electro Luminescence) having an organic compound as a light emitting substance and an inorganic EL having an inorganic compound as a light emitting substance. In the sensor 201, imaging elements are arranged in matrix.

In general, a fingerprint has a gap of approximately 500 μm between a ridge line and a valley line, therefore, imaging elements are preferably provided so as to have a gap of 500 μm or less therebetween. More preferably, imaging elements are provided so as to have a gap of 100 μm or less therebetween since a width of a ridge line is approximately 100 to 300 μm or less.

As an example of a method for detecting a fingerprint by sensing ridge lines and valley lines on a pad of a finger, various methods have been suggested. For example, there is a method (an optical method) in which irradiation or scanning of light to ridge lines and valley lines on a pad of a finger is conducted and intensity of reflected light is detected by a photoelectric converter, a method (a capacitive method) in which a gap between a micro-electrode and a skin of a pad of a finger is used as a micro-condenser and minute current is supplied to each condenser to detect a difference in electrical potential, a method (a pressure-sensitive method) in which an element which changes its resistance value according to pressure applied thereto is used and a difference in pressure corresponding to ridge lines and valley lines on a pad of a finger is detected, and the like. Although an optical method is employed in this embodiment mode, a method for detecting fingerprint ridge and valley lines is not specifically limited thereto and any method can be employed as long as a fingerprint can be detected so as to be processed as image data.

The fingerprint reading sensor 201 is set in a position in which a pad of a finger of a user touches the sensor inevitably when the user holds the ID card 200 in the hand. The sensor 201 may be any one as long as it has an enough area to touch and read a pad of a finger including a first joint.

The electromagnetic wave transmitter/receiver part 210 has the antenna 211, a power supply circuit 217, the clock generation circuit 213, the A/D converter circuit 216, the demodulation circuit 214, and the modulation circuit 215 and controls transmission and reception of data by an electromagnetic wave.

The antenna 211 for transmitting and receiving an electromagnetic wave is preferably formed by leading a metal with high conductivity such as aluminium and silver and formed to have a fixed gap and a predetermined length. Note that the antenna 211 is connected to the clock generation circuit 213 so that a predetermined frequency can be obtained from a received electromagnetic wave.

The electromagnetic wave received by the antenna 211 is supplied to the power supply circuit 217 and converted into power required for operating the ID card 200.

The ID card 200 operates with power generated by the power supply circuit 217. However, when the power generated in the power supply circuit 217 is not enough to operate all functions mounted in the ID card 200, the auxiliary power unit 204 can be provided. As the auxiliary power unit 204, a thin power source is preferably used, such as a button-shaped battery which generates power by a chemical reaction and a solar cell film using a photoelectric element.

The electromagnetic wave received by the antenna 211 is reconstructed into the original data in the demodulation circuit 214 and converted into digital data in the A/D converter circuit 216 and transmitted to the CPU 205.

Data processed in the CPU 205 is encoded in the modulation circuit 215. A subcarrier generated at this time is transmitted outside from the antenna 211.

The memory device 203 (memory) provided in the ID card 200 has a memory cell including a memory element, a column decoder, a row decoder, and a selector in a region in which a word line and a bit line intersect with each other with an insulator interposed therebetween.

The memory device 203 is preferably a nonvolatile memory so that registered data and initial settings of the CPU 205 can be held when power is not supplied to the ID card 200.

Note that the memory device 203 preferably is rewritable. When a rewritable nonvolatile memory is used, data for a check can be rewritten, which leads to improvement in security.

The central processing unit (CPU) 205 provided in the ID card 200 includes an analysis circuit between the CPU and the demodulation circuit 214, an RF interface having an encoding circuit between the CPU and the modulation circuit 215, a memory interface between the CPU and the memory device 203, and a sensor interface between the CPU and the fingerprint reading sensor 201. In addition, the CPU 205 has the encryption circuit 206 for encrypting data transmitted through each interface and the decryption circuit 207 for decrypting the data.

The central processing unit (CPU) 205 is preferably connected to a volatile memory 208 during operation as an operation space. The connection of the CPU 205 to the volatile memory with enough capacity can shorten a processing time of the CPU 205.

The encryption circuit 206 and the decryption circuit 207 are not necessarily provided as dedicated circuits. An encryption/decryption function may be programmed in the CPU 205 as software.

Figure 3:
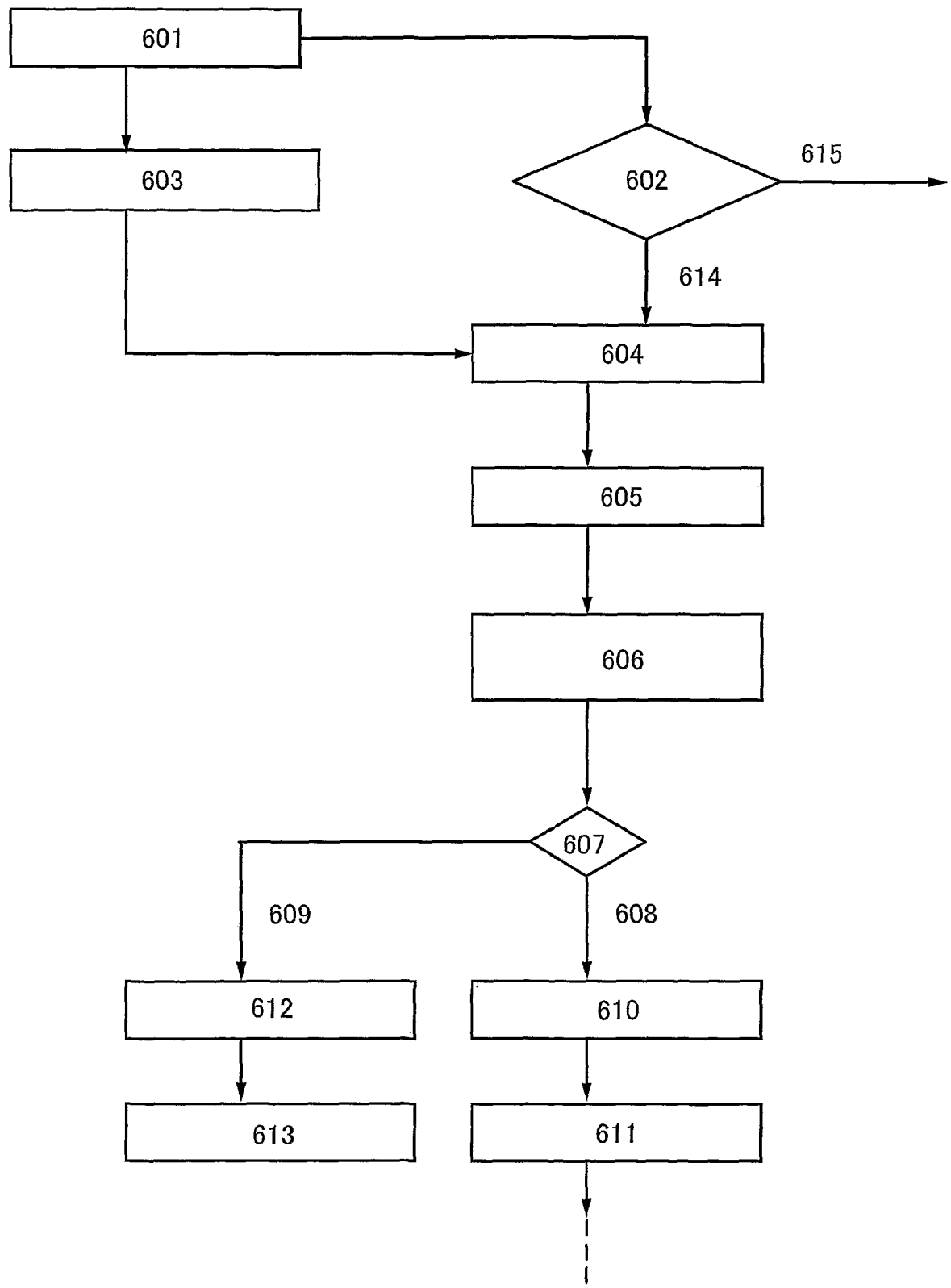
FIG. 3 is a flow chart of a communication system of the present invention.

Next, a personal authentication system is described. A flow chart of a personal authentication system (a normal use mode) of the present invention is shown in FIG. 3.

A user holds an ID card so as to touch the fingerprint reading sensor 201 with a pad of a registered finger including a first joint and holds the ID card near a terminal connected to a management server. The ID card receives an electromagnetic wave transmitted from the terminal and generates power, so that the CPU starts operation (601). In addition, after the start of the CPU, the sensor 201 and the memory device 203 start operation. Note that, for example, a light source may be provided in the terminal. If a solar cell film is provided in the ID card, it is possible to supply power to the ID card using optical energy which is obtained from the light source when the ID card is held near the terminal.

The CPU 205 has a specific register for judging presence or absence of a reference password (hereinafter, referred to as an initialization checking register). Therefore, the CPU 205 recognizes a state of the initialization checking register (602) when starting and samples fingerprint image data (603).

Information on the fingerprint sampled by the fingerprint reading sensor 201 is converted into digital data in the A/D converter circuit 202 and processed into a form of a two dimensional pattern data of a ridge line and a valley line (hereinafter, referred to as fingerprint image data). As a method for correcting an error in reading due to delicate displacement caused by every sampling and due to change in a physical condition such as sweat and skin roughness, various techniques have been suggested in this field.

As described above, fingerprint image data sampled as reproducible data uniquely corresponding to each registrant is processed to emphasize light and shade thereof and divided into predetermined areas. Here, the predetermined area is required to be larger than an area which includes at least one of ridge lines in the taken fingerprint image data.

Figure 4:
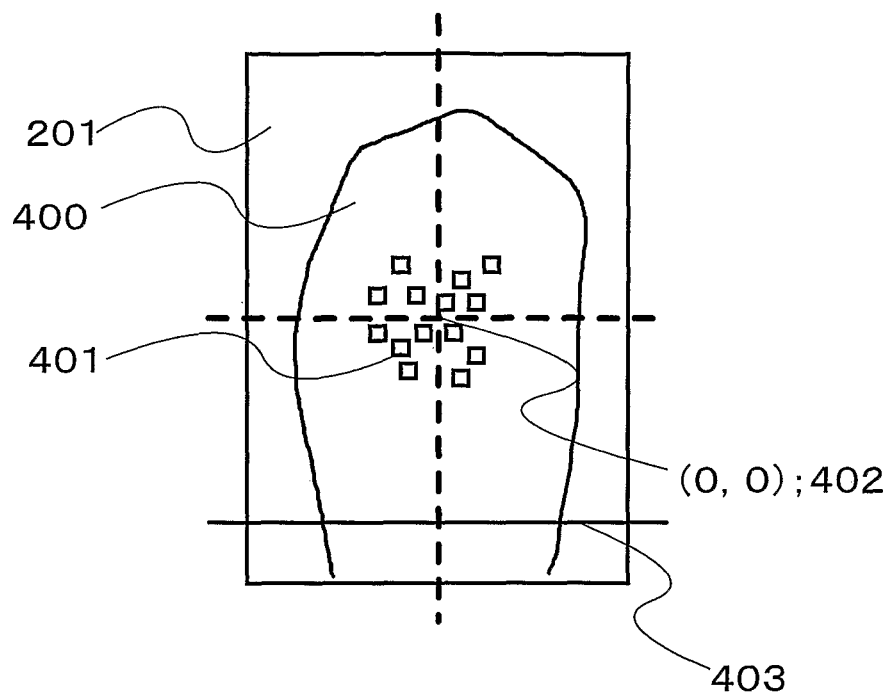
FIG. 4 is a diagram showing coordinates for reading fingerprint image data.

FIG. 4 shows coordinates for reading a fingerprint. Fingerprint image data is divided with reference to a center point (0, 0) 402 of the sensor 201 and a straight line 403 which is parallel to the first joint. A line of the first joint is deeper and heavier than a line of a pad of a finger; therefore, the line of the first joint can be easily recognized when the fingerprint image data is processed. Note that the center point (0, 0) 402 of the sensor 201 is not on the straight line 403 which is parallel to the first joint. When a straight line and a point which is not on the straight line are provided, directions of coordinate axes are fixed and displacement of a finger of a user can be easily corrected. In addition, since personal features in the fingerprint are clearly seen from a fingertip to the first joint, when there are a plurality of lines of the first joint, the nearest one to the center point (0, 0) 402 is preferably selected.

From the aforementioned divided pieces of fingerprint image data each having a predetermined area, n pieces are selected (n is a natural number). Each of the n pieces includes the same coordinate point as that selected when the fingerprint image data is registered. In each selected fingerprint image data, a presence or absence of a feature (minutia) such as a fingerprint ridge line, end, and bifurcation is detected (614). If a feature is detected, the feature is classified by its shape. Then, a plurality of character patterns each of which uniquely identifies an attribute are arranged with reference to a correspondence table (604) to form a password used for a check (605) (also simply referred to as a password or password for a check).

A hash value is calculated from the password for a check (606). Here, a hash value is given by a calculation method in which a pseudorandom number is generated from an original text with an unfixed length. That is, a function with which long information with an unfixed data width is compressed (summarized) to be short information with a fixed data width. The result of the calculation of an original text with the hash function is the hash value. The hash value calculated from the password for a check and a reference password registered in the memory device 203 are checked against each other (607). When a hash value of a password for a check which is obtained from fingerprint image data of a person who is holding the ID card near the terminal and a hash value of the reference password registered in the memory device 203 match (608), the ID card recognizes the current user as an authorized user and transmits a signal corresponding to authentication completion (authentication-complete signal) to the management server (610).

When the management server receives the authentication-complete signal, the management server requires the ID number. Like a conventional system, the management server receives an ID number from the ID card, and then identifies the ID number stored in the management server to provide predetermined service (611).

When a hash value of a password for a check which is obtained from fingerprint image data of a person who is holding the ID card near the terminal and a hash value of the reference password registered in the memory device 203 do not match (609), the ID card recognizes the current user as an unauthorized user and transmits a signal corresponding to an unauthorized user (authentication-incomplete signal) to the management server to shut down the CPU 205 (612). When the management server receives the authentication-incomplete signal, the communication is ended (613).

Figure 6:
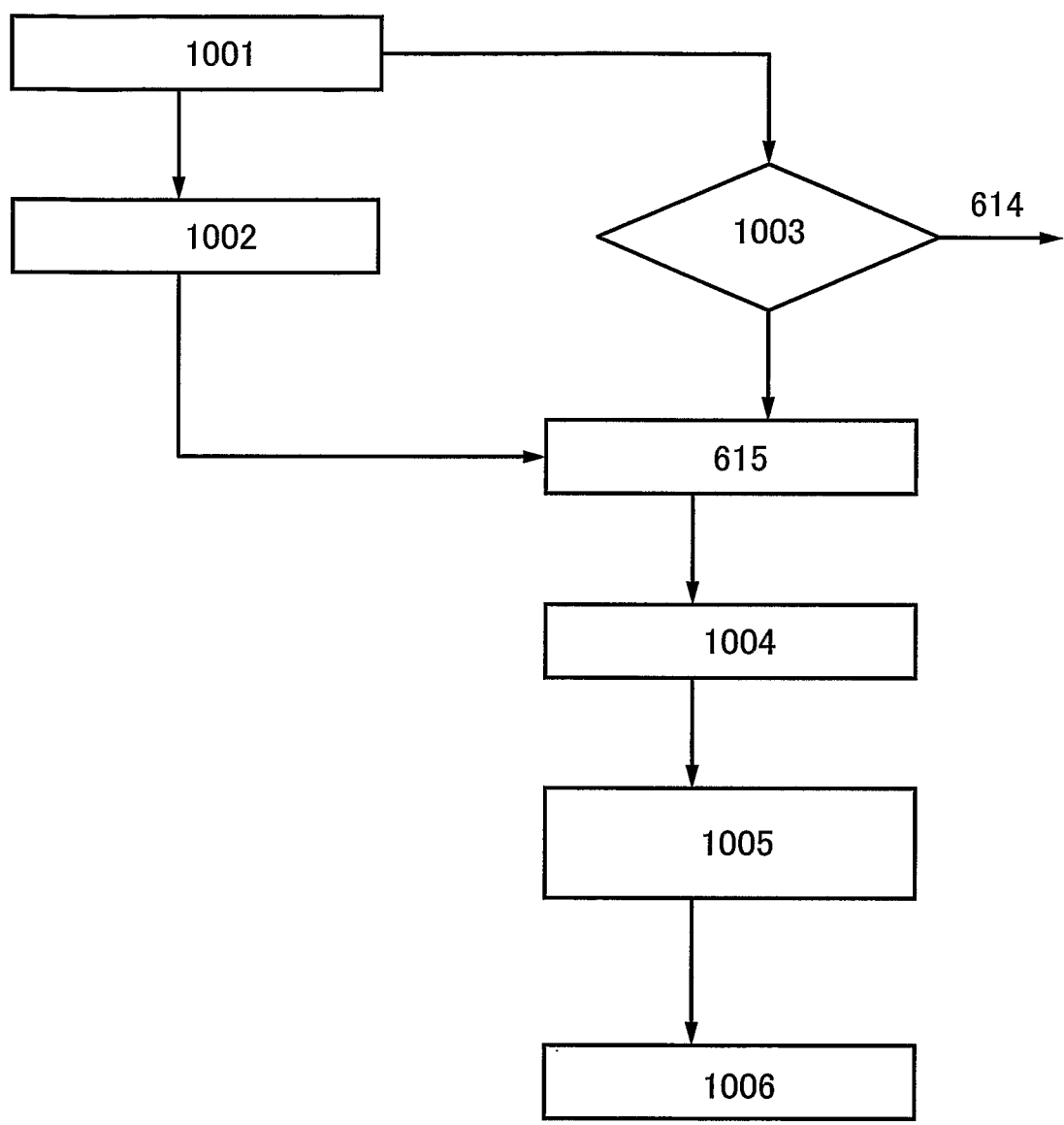
FIG. 6 is a flow chart of a communication system of the preset invention.

Next, a procedure for registering an ID card user or a procedure for changing a password (a registration change mode) is explained with reference to FIG. 6.

The registration change mode and the normal use mode are changed by initialization of an ID card. Note that initialization of an ID card is means making a new correspondence table.

The CPU 205 has a specific register which can judge whether a new correspondence table is required or not (hereinafter, referred to as an initialization checking register). Therefore, the CPU 205 recognizes a state of the initialization checking register when starting the CPU 205 (1001), and if the initialization checking register shows that the ID card has been initialized, the CPU 205 recognizes a registration change mode and samples fingerprint image data (1002) to make a new correspondence table (615).

The sampled finger print image data is processed to emphasize light and shade thereof and divided into predetermined areas. From the divided pieces of fingerprint image data each having a predetermined area, n pieces are selected (n is a natural number). Each of the n pieces includes a coordinate point which is defined according to a random number generated in the CPU 205. In each selected fingerprint image data, a presence or absence of a feature (minutia) such as a fingerprint ridge line, end, and bifurcation is detected. If a feature is detected, the feature is classified by its shape. Then, a plurality of character patterns each of which uniquely identifies an attribute is arranged with reference to a newly made correspondence table to form a new reference password (1004).

Then, a hash value is calculated from the new reference password (1005) and stored (1006) in the memory device 203, thereby completing an operation.

Note that the registration change mode and the normal use mode may be changed in a manner in which a command corresponding to the registration change mode or the normal use mode is transmitted from the management server and the command is received and executed by the ID card.

A method for making a correspondence table is described.

FIGS. 5A to 5H show character pattern correspondence tables with which a shape of feature uniquely identifies its attribute. Each of FIGS. 5A to 5H is the divided piece of the fingerprint image data 401 having a predetermined area shown in FIG. 4.

Figure 5A:
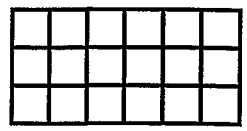
FIGS. 5A to 5H show features of divided fingerprint image data.
Figure 5B:
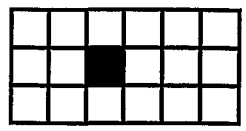
Figure 5C:
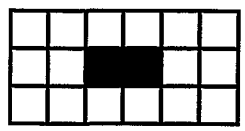
Figure 5D:
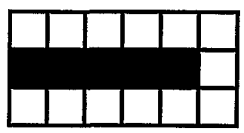
Figure 5E:
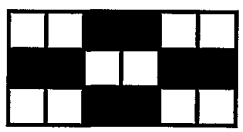
Figure 5F:
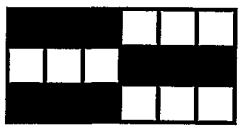
Figure 5G:
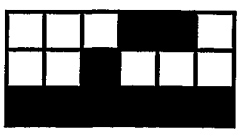
Figure 5H:

In processing the fingerprint image data, it is assumed that a width of a ridge line corresponds to just one pixel and a ridge line is shown in black and a valley line is shown in white. In FIG. 5A, there is no ridge line in a selected area. In FIG. 5B, there is a dot-shaped ridge line. In FIG. 5C, there is a ridge line which is longer than that in FIG. 5B and both ends are in a selected area. In FIG. 5D, a ridge line is longer than that in FIG. 5C and one end is in a selected area. In FIG. 5E, an island-shaped valley line exists between a plurality of ridge lines. In FIG. 5F, a ridge line is bifurcated. In FIG. 5G one end of a bifurcated ridge line such as shown in FIG. 5F is in a selected area. In FIG. 5H, a plurality of ridge lines is crossed. In this embodiment mode, a correspondence table is made with which a shape and a direction of a feature are uniquely identified as a character pattern. For example, a character pattern "000" indicates that there is no feature, "100" indicates that there is a dot-shaped ridge line, "200" indicates there is a short horizontal ridge line, and "290" indicates that there is a short lengthwise ridge line.

The correspondence tables of a plurality of ID cards are not needed to be identical to each other. A shape and a direction of a feature may be uniquely identified as a character pattern in a different way from described above. For example, a correspondence table may be formed, in which "A00" indicates that there is no feature, "B00" indicates that there is a dot-shaped ridge line, "C00" indicates that there is a short horizontal ridge line, and "D90" indicates that there is a short lengthwise ridge line.

In addition, one ID card may have a plurality of correspondence tables and a correspondence table to be used can be arbitrarily changed. That is, a plurality of correspondence tables can be formed from each fingerprint image data. To change a correspondence table means to change a password; therefore, security can be improved unless a user remembers many passwords.

In this embodiment mode, in a registration change mode, a progression of a plurality of character patterns corresponding to the selected coordinates arranged with reference to a correspondence table is used as a password for a check, and then, a hash value calculated from the password for a check and a hash value calculated from a reference password which has been registered in advance are checked against each other. However, authentication can be conducted by simply checking the password for a check against the reference password without calculation with a hash function, though security is lowered.

As described above, according to the present invention, when a third person holds the ID card near the terminal, the ID card transmits an authentication-incomplete signal to express that the person who is holding the ID card near the terminal is not the authorized user. Therefore, spoofing by a third person can be prevented so that the third person cannot get any beneficial information from information transmitted from the ID card.

In addition, the ID card conducts authentication to recognize a person who is holding the ID card near the terminal as an authorized user or not, and transmits only a result of the authentication to the management server. Thus, the number of communications between the ID card and the management server can be reduced. Therefore, power consumption of communication can be lowered and a risk of interception of a transmitting and receiving signal becomes lowered.

Data for a checking including finger print image data is stored in the ID card and is not transmitted outside the ID card. Therefore, when an unauthorized person intrudes into the management server, data for a check for personal authentication is not leaked.

Data for a check stored in the ID card is a result of a calculation which uses the fingerprint image data of a user indirectly, and biometrics of the fingerprint image data is not stored anywhere, so that the system can be operated preferably from the aspect of protection of human rights.

In addition, since an antenna, a CPU, a memory, a sensor, and the like are integrated over one substrate, the system can be manufactured at low cost.

In the present invention, a sensor for reading biometrics may be mounted not only on one side of the ID card but also both sides of the ID card. In that case, a password can be formed with both of fingerprints of a pad of a thumb and a pad of a forefinger or both of fingerprints of a pad of a thumb and a side of a forefinger. In that case, two passwords can be formed from two fingerprints or one password can be formed from two fingerprints. The use of two pieces of biometrics can further improve security.

Embodiment 1

In this embodiment, as an example of application of the personal authentication system in Embodiment Mode 1, the personal authentication system is applied to an entry management system. In this embodiment a case is explained with reference to FIG. 7, in which in the entry management system, a random number is encrypted with an encryption key which is generated from data sampled from biometrics, and a hash value calculated from the encrypted random number is used as data for a check.

Figure 7:
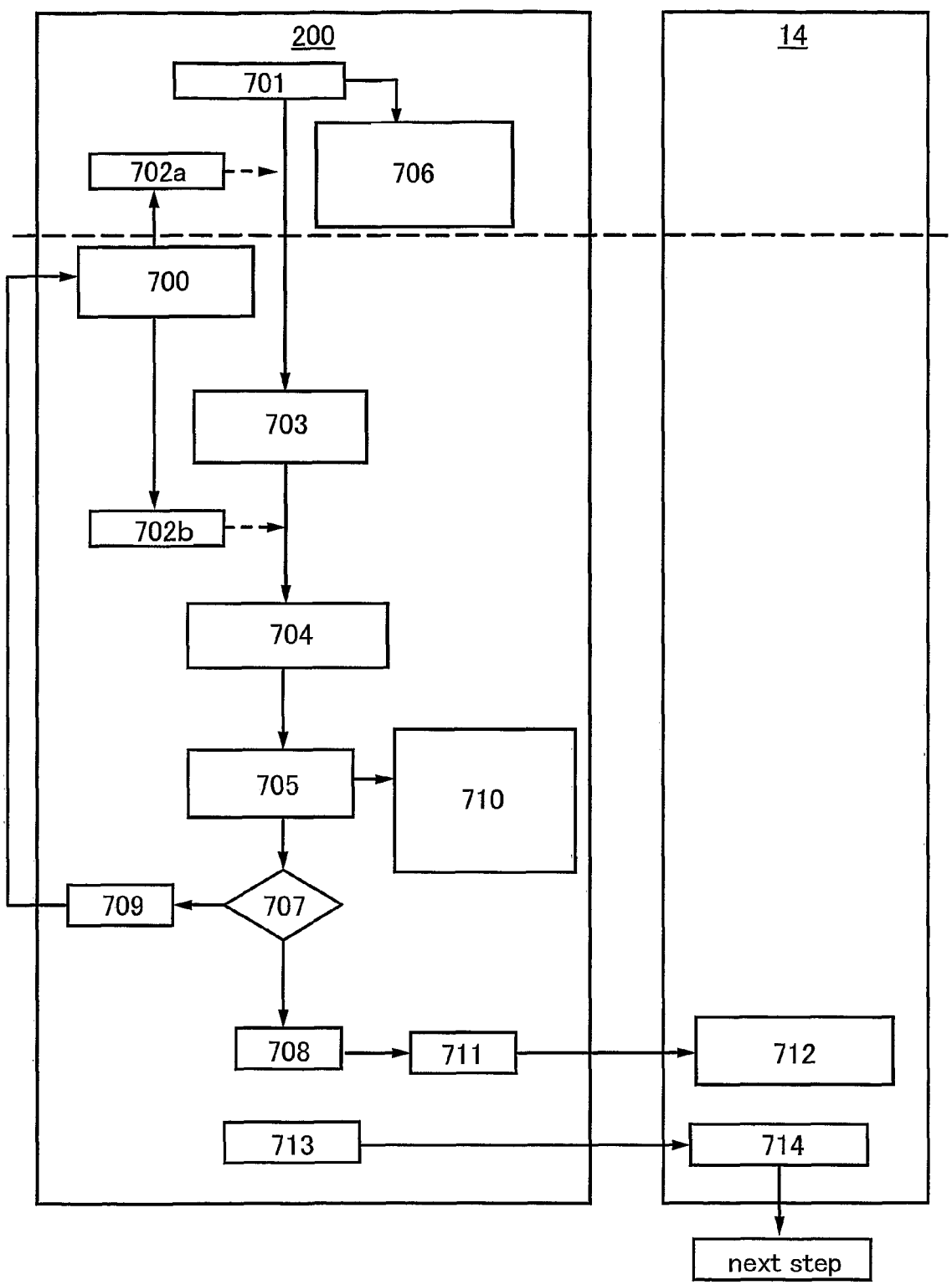
FIG. 7 is a flow chart of an example of a communication system of the preset invention.

FIG. 7 shows a flow chart of the personal authentication system of this embodiment. A user holds an ID card 200 so as to touch the fingerprint reading sensor 201 shown in FIG. 2 with a pad of a finger including a first joint and holds the ID card near a terminal connected to a management server 14. The ID card receives an electromagnetic wave transmitted from the terminal and generates power, so that the CPU starts operation. In addition, after the start of the CPU 205, the sensor 201 and the memory device 203 start operation.

Then, as described in Embodiment Mode 1, fingerprint image data is sampled (700) and divided into predetermined areas.

From the divided pieces of fingerprint image data each having a predetermined area, n pieces are selected (n is a natural number). Each of the n pieces includes a coordinate point which is defined according to a random number 701 generated in the CPU 205. In each selected fingerprint image data, a presence or absence of a feature (minutia) such as a fingerprint ridge, end, and bifurcation is detected. If a feature is detected, the feature is classified by its shape. Then, a key A'702b is formed with a progression of a plurality of character patterns corresponding to the selected coordinate with reference to a correspondence table which is formed in a registration change mode to uniquely identify an attribute of a feature such as a shape and a direction.

N, which is a natural number and is the number of selected pieces of the divided pieces of fingerprint image data each having a predetermined area, is the same number as a bit number of a key A702a and the key A'702b. As a bit number of a key increases, decryption becomes exponentially difficult; therefore, security can be improved as the natural number n increases. Note that it is clear that the natural number n cannot be larger than the number of divided pieces of fingerprint image data each having a predetermined area.

Then, with the key A'702b, a random number E(R, A) (703) which is encrypted and stored in the memory device 203 in the last authentication is decrypted (704). A hash value h (D(E(R, A))) which is calculated from the a random number D(E(R, A)) (705) and reference data h (R) (706) stored in the memory device 203 are checked against each other (707).

After the check, the key A702a and the decrypted random number D(E(R,A)) are abandoned. The hash value h(D(E(R, A))) calculated from the decrypted random number D(E(R, A)) is stored in the memory device 203 to be used as reference data for the next check (709).

When a hash value h(D(E(R, A))) calculated from the decrypted random number D(E(R, A)) and reference data h(R) stored in the memory device 203 match (708), the ID card recognizes (711) a person who is holding the ID card near the terminal as an authorized user registered in the ID card, and transmits an authentication-complete signal to the management server.

When the management server receives the authentication-complete signal (712), an ID number is required. The ID card receives ID requirement from the management server and transmits (713) the ID number. Then, like a conventional system, the management server receives an ID number from the ID card, and identifies the ID number stored in the management server to provide predetermined service (714).

When the hash value h(D(E(R, A))) calculated from the decrypted random number D(E(R, A)) and the reference data h(R) stored in the memory device 203 do not match (709), the ID card recognizes a person who is holding the ID card near the terminal as an unauthorized user who is not registered in the ID card, and transmits an authentication-incomplete signal to the management server to shut down the CPU 205.

When the management server receives the authentication-incomplete signal, the communication is ended.

Next, a procedure for registering an ID card user or a procedure for changing a password is explained.

The registration change mode and the normal use mode are changed by initialization of an ID card. Note that initialization of an ID card is the same as to make a new correspondence table.

The CPU 205 has a specific register which can judge whether a new correspondence table is required or not (hereinafter, referred to as an initialization checking register). Therefore, the CPU 205 recognizes a state of the initialization checking register when starting the CPU 205, and if the initialization checking register expresses initialization, recognizes a registration change mode and samples fingerprint image data to make a new correspondence table. The operation of the CPU 205 ends when the key A702a is formed with reference to the new correspondence table.

The correspondence table is made according to Embodiment Mode 1. That is, the sampled finger print image data is processed to emphasize light and shade thereof and divided into predetermined areas. From the divided pieces of fingerprint image data each having a predetermined area, n pieces are selected (n is a natural number). Each of the n pieces includes a coordinate point which is defined according to a random number generated in the CPU 205. In each selected fingerprint image data, a presence or absence of a feature (minutia) such as a fingerprint ridge, end, and bifurcation is detected. If a feature is detected, the feature is classified by its shape. At this time, the correspondence table is made with which a shape and a direction are uniquely identified as a character pattern. For example, a character pattern "000" indicates that there is no feature, "100" indicates that there is a dot-shaped ridge line, "200" indicates that there is a short horizontal ridge line, and "290" indicates that there is a short vertical ridge line. Then, a plurality of character patterns each of which uniquely identifies an attribute is arranged with reference to a newly made correspondence table to form a new key A and a key A' which is opposite to the key A.

Next, a random number R is generated in the CPU 205. The random number R is replicated into two and one is encrypted using the key A and the other is used for calculating the hash value h(R). A random number E(R, A) encrypted using the key A and the calculated hash value h(R) are stored in the memory device 203 to be used as reference data from the next check. The random number R and the key A are abandoned.

The reference data is encrypted; therefore, the same key is used for the encryption and decryption (decoding). In this specification, a key for encryption is called the key A702a while a key for decryption is called the key A'702b so that they are easily distinguished in FIG. 7.

Note that the registration change mode and the normal use mode may be changed in a manner in which a command corresponding to the registration change mode or the normal use mode is transmitted and the command is received and executed by the ID card.

In this embodiment, an example in which the reference data stored in the last authentication are used in the normal use mode. However, the reference data stored in registration is not necessarily abandoned and may be used as the reference data every time. Alternatively, the random number R may be generated in every personal authentication to calculate the hash value h(R) and the hash value h(R) may be stored in the memory device 203 to be used as reference data in the next check.

As described above, according to the present invention, when a third person holds the ID card near the terminal, the ID card transmits an authentication-incomplete signal to express that the person who is holding the ID card near the terminal is not the unauthorized user. Therefore, spoofing by a third person can be prevented so that the third person cannot get any beneficial information from information transmitted from the ID card.

In addition, the ID card conducts authentication to recognize a person who is holding the ID card near the terminal as an authorized user or not, and transmits a result of the authentication to the management server. Thus, the number of communications between the ID card and the management server can be reduced. Therefore, power consumption of communication can be lowered and a risk of interception of a transmitting and receiving signal becomes lower.

Data for a check including finger print image data is stored in the ID card and is not transmitted outside the ID card. Therefore, when an unauthorized person intrudes into the management server, data for a check for personal authentication is not leaked.

Data for a check stored in the ID card is a result of a calculation which uses the fingerprint image data of a user indirectly, and biometrics of the fingerprint image data is not stored anywhere, so that the system can be operated preferably from the aspect of protection of human rights.

Embodiment 2

In this embodiment, a case in which the personal authentication system is introduced to an entry management system is hereinafter explained.

A person who wants to enter the room gets an initialized ID card from a manager and registers data for a check of oneself in the ID card.

Then, the person goes to the room and holds the ID card in the hand near a terminal placed near a door of the room. At this time, the ID card receives an electromagnetic wave transmitted from the terminal and generates power to start operation.

Then, the ID card samples a fingerprint of the user and forms a key A from the fingerprint image data. With the key A, a random number E(R, A) which is encrypted and stored in the last authentication in the memory device provided in the ID card is decrypted and a hash value h(D(E(R, A))) is calculated from the result of the decryption. The calculated hash value h(D(E(R, A))) and data for a check h(R) are verified. When they match, an authentication-complete signal is transmitted to the management server; when they do not match, an authentication-incomplete signal is transmitted to the management server.

When the management server receives the authentication-complete signal, a signal of ID number requirement is transmitted to the ID card. The ID card receives the ID number requirement from the management server and transmits the ID number. The management server identifies the ID number transmitted from the ID card. When the user is a person who is permitted to enter the room, the door is unlocked.

When the management server receives the authentication-incomplete signal, the communication between the management server and the ID card is ended. Needless to say, the door remains locked. A buzzer or a lamp may be provided to the terminal which is placed near the door of the room so as to show that the current user of the ID card is not authenticated as an authorized user registered in the ID card.

Communication between the ID card and the management server is conducted through the terminal placed near the door of the room.

Note that in an entry management system with low security, the management server may identify the user on receiving of the authentication-complete signal from the ID card and the door may be unlocked.

Embodiment 3

In this embodiment, a manufacturing process of a thin film transistor in a sensor part, an electromagnetic wave transmitter/receiver part, a memory device, and a central processing unit constituting a card-shaped semiconductor device is described with reference to FIGS. 8A to 8D.

Figure 8A:
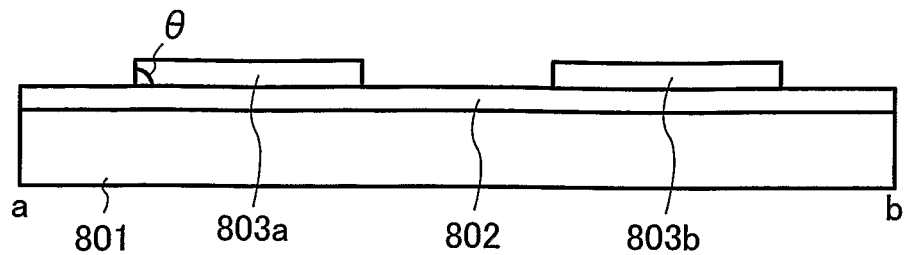
FIGS. 8A to 8D show an example of a manufacturing method of a semiconductor device used for a communication system of the present invention.

First, island-shaped semiconductor films 803a and 803b are formed over a substrate 801 (FIG. 8A). As to the island-shaped semiconductor films 803a and 803b, an amorphous semiconductor film is formed using a material mainly containing silicon (Si) (such as $Si_xGe_{1-x}$) by a known method (such as a sputtering method, an LPCVD method, a plasma CVD method, and the like) over an insulating film 802 which has been formed over the substrate 801. Then, the amorphous semiconductor film is crystallized and the semiconductor film is selectively etched to form the island-shaped semiconductor films. To crystallize the amorphous semiconductor film, a known method such as a laser crystallization method, a thermal crystallization method using RTA or an annealing furnace, a thermal crystallization method using a metal element promoting crystallization, or a combination of the methods can be adopted. In FIGS. 8A to 8D, an angle of an end shape of the island-shaped semiconductor films 803a and 803b is generally orthogonal ($85° \leq \theta \leq 100°$).

As the substrate 801, a glass substrate such as barium borosilicate glass or alumino borosilicate glass, a quartz substrate, a ceramic substrate, a metal substrate including stainless steel or the like can be used. In addition, a substrate formed from plastics typified by polyethylene terephthalate (PET), polyethylene naphthalate (PEN), or polyethersulfone (PES), or a synthetic resin having flexibility such as acrylic can be used. By using a flexible substrate, a foldable semiconductor device can be manufactured. Further, there is no limitation in the area or shape of the substrate when using such a substrate, and thus, a rectangular substrate having one side of 1 meter or more, for example, is used as the substrate 801 so as to enhance the productivity significantly. Such merit is a great advantage as compared with a circular silicon substrate.

An insulating film 802 functions as a base film and it is provided so as to prevent an alkali metal or an alkaline-earth metal from being dispersed into the semiconductor films 803a and 803b from the substrate 801 and from influencing adversely on characteristics of a semiconductor element. As the insulating film 802, a single-layer structure or a stacked-layer structure of insulating films containing oxygen or nitrogen such as silicon oxide ($SiO_x$), silicon nitride ($SiN_x$), silicon oxynitride ($SiO_xN_y$) (x>y), and silicon nitride oxide ($SiN_xO_y$) (x>y) can be employed. For example, when providing the insulating film 802 to have a two-layer structure, a silicon nitride oxide film as a first insulating film and a silicon oxynitride film as a second insulating film may be provided. When providing the insulating film 802 to have a three-layer structure, a silicon oxynitride film as a first insulating film, a silicon nitride oxide film as a second insulating film, and a silicon oxynitride film as a third insulating film may be provided.

The semiconductor films 803a and 803b can be formed of an amorphous semiconductor or a semiamorphous semiconductor (SAS). Alternatively, a polycrystalline semiconductor film may be used. An SAS is a semiconductor with an intermediate structure between an amorphous structure and a crystalline structure (including a single crystal and a polycrystal). In addition, an SAS is a semiconductor having a third condition that is stable in terms of free energy, and a crystalline region having a short range order and lattice distortion is included in an SAS. A crystalline region of 0.5 to 20 nm can be observed at least in a part of region in the film. When silicon is contained as the main component, Raman spectrum is shifted to a lower wavenumber side less than 520 $cm^{-1}$. Diffraction peak of (111) or (220) to be caused from a crystal lattice of silicon is observed in X-ray diffraction. At least 1 atomic % or more of hydrogen or halogen is contained to terminate a dangling bond. An SAS is formed by carrying out grow discharge decomposition (plasma CVD) on a gas containing silicon. As the gas containing silicon, $Si_2H_6$, $SiH_2Cl_2$, $SiHCl_3$, $SiCl_4$, $SiF_4$, or the like can be used in addition to $SiH_4$. In addition, $GeF_4$ may be mixed. This gas containing silicon may be diluted with $H_2$ or $H_2$ and one or more of the rare gas element selected from He, Ar, Kr, and Ne. A dilution ratio ranges from 2 to 1000 times. A pressure ranges approximately from 0.1 to 133 Pa, and a power frequency ranges from 1 to 120 MHz, preferably from 13 to 60 MHz. A substrate heating temperature may be 300° C. or less. It is desirable that an atmospheric constituent impurity such as oxygen, nitrogen, or carbon is $1 \times 10^{20}$ $cm^{-1}$ or less as an impurity element in the film, specifically an oxygen concentration is $5 \times 10^{19}$/$cm^3$ or less, preferably $1 \times 10^{19}$/$cm^3$ or less. An amorphous semiconductor film is formed by a known method (such as a sputtering method, an LPCVD method, and a plasma CVD method) with a material mainly containing silicon (Si), (such as $Si_xGe_{1-x}$). Then, the amorphous semiconductor film is crystallized by a known crystallization method such as a laser crystallization method, a thermal crystallization method using RTA or an annealing furnace, and a thermal crystallization method using a metal element promoting crystallization. As another crystallization method, a method in which thermal plasma is generated by applying DC bias and the semiconductor film is treated with the thermal plasma may be employed.

Figure 8B:
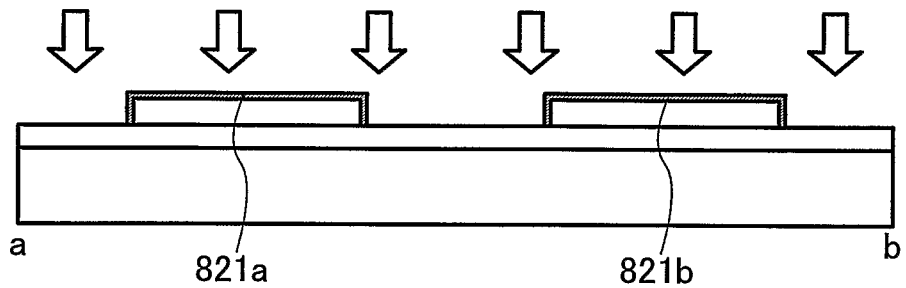

A plasma treatment is conducted to the semiconductor films 803a and 803b to oxidize or nitride the semiconductor films 803a and 803b, thereby forming oxide films or nitride films (hereinafter, also referred to as insulating films 821a and 821b) over the surface of the semiconductor films 803a and 803b (FIG. 8B). For example, when Si is used for the semiconductor films 803a and 803b, silicon oxide ($SiO_x$) or silicon nitride ($SiN_x$) is formed as the insulating films 821a and 821b. In addition, after oxidizing the semiconductor films 803a and 803b by a plasma treatment, a plasma treatment may be conducted again to nitride the semiconductor films 803a and 803b. In this case, silicon oxide ($SiO_x$) is formed in contact with the semiconductor films 803a and 803b, and silicon nitride oxide ($SiN_xO_y$) (x>y) is formed over the surface of the silicon oxide. When the semiconductor films are oxidized by the plasma treatment, the plasma treatment is conducted in an atmosphere containing oxygen (such as an atmosphere containing oxygen ($O_2$) and a rare gas (at least one of He, Ne, Ar, Kr, and Xe); an atmosphere containing oxygen, hydrogen ($H_2$) and a rare gas; or an atmosphere containing dinitrogen monoxide and a rare gas). Meanwhile, in the case where the semiconductor films are nitrided by the plasma treatment, the plasma treatment is conducted in an atmosphere containing nitrogen (such as an atmosphere containing nitrogen ($N_2$) and a rare gas (at least one of He, Ne, Ar, Kr, and Xe); an atmosphere containing nitrogen, hydrogen and a rare gas; or an atmosphere containing $NH_3$ and a rare gas). As a rare gas, Ar can be used, for example. Alternatively, a mixed gas of Ar and Kr may be used. Since a rare gas is used for the plasma treatment, the rare gas used in the plasma treatment is contained in the insulating films 821a and 821b. When Ar is used, the insulating films 821a and 821b contain Ar.

In addition, the plasma treatment is conducted with an electron density of $1\times10^{11}$ $cm^{-3}$ or more and an electron temperature of plasma of 1.5 eV or less in the atmosphere containing the gases described above. More specifically, the electron density is $1\times10$ to $1\times10^{13}$ $cm^{-3}$, and the electron temperature of plasma is 0.5 to 1.5 eV. The electron density of plasma is high and the electron temperature around an object (here, the semiconductor films 803a and 803b) formed over the substrate 801 is low. Thus, plasma damages to the object can be avoided. In addition, since the plasma density is as high as $1\times10^{11}$ $cm^{-3}$ or more, the oxide film or the nitride film formed by oxidizing or nitriding the object by the plasma treatment has a superior evenness of a film thickness as compared with a film formed by a CVD method, a sputtering method or the like, and thus, a dense film can be formed. In addition, since the electron temperature of plasma is as low as 1.5eV or less, the oxidizing the nitriding treatment can be conducted at a lower temperature than a conventional plasma treatment or thermal oxidation method. For example, the oxidizing or nitriding treatment can be conducted sufficiently even when a plasma treatment is conducted at a lower temperature by at least 100° C. than a strain point of a glass substrate. As the frequency for producing plasma, a high frequency wave such as a micro wave (2.45 GHz) can be employed. Note that hereinafter a plasma treatment is conducted with the foregoing condition unless otherwise noted.

Figure 8C:
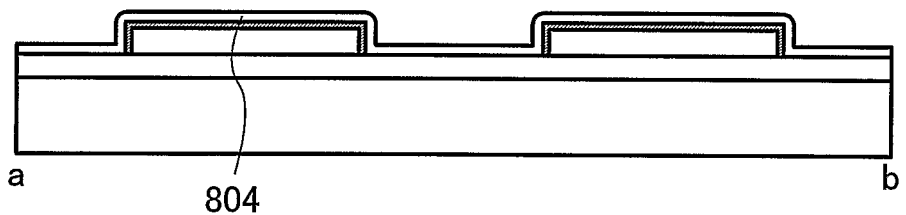

Next, a gate insulating film 804 is formed to cover the insulating films 821a and 821b (FIG. 8C). The gate insulating film 804 can be formed to have a single-layer structure or a stacked-layer structure of insulating films containing nitrogen or oxygen such as silicon oxide ($SiO_x$), silicon nitride ($SiN_x$), silicon oxynitride ($SiO_xN_y$) (x>y), and silicon nitride oxide ($SiN_xO_y$) (x>y). For example, when Si is used for the semiconductor films 803a and 803b and oxidized by a plasma treatment to form silicon oxide as the insulating films 821a and 821b over the surfaces of the semiconductor films 803a and 803b, silicon oxide ($SiO_x$) is formed as the gate insulating film over the insulating films 821a and 821b. In addition, in FIG. 8B, when thicknesses of the insulating films 821a and 821b which are formed by oxidizing or nitriding the semiconductor films 803a and 803b by a plasma treatment are thick enough, the insulating films 821a and 821b can be used as the gate insulating films.

Figure 8D:
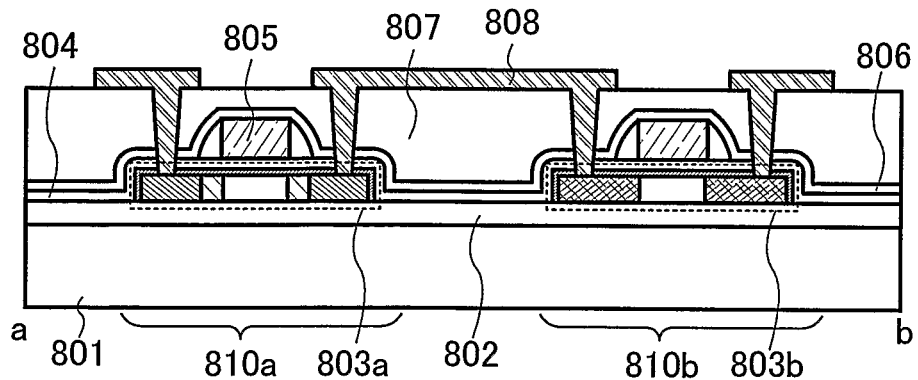

Next, a gate electrode 805 is formed over the gate insulating film 804. Insulating films 806 and 807 are formed so as to cover the gate electrode 805. A conductive film 808 which is electrically connected to a source or drain region in the semiconductor films 803a and 803b over the insulating layer 807 is formed. Thus, a semiconductor device in which an n-type thin film transistor 810a and a p-type thin film transistor 810b having island-shaped semiconductor films 803a and 803b as a channel formation region, respectively can be manufactured (FIG. 8D).

As the insulating film 806, a single-layer structure or a stacked-layer structure of insulating films containing nitrogen or oxygen such as silicon oxide ($SiO_x$), silicon nitride ($SiN_x$), silicon oxynitride ($SiO_xN_y$) (x>y), and silicon nitride oxide ($SiN_xO_y$) (x>y), or a film containing carbon such as DLC (diamond like carbon) can be employed.

As the insulating film 807, an organic material such as epoxy, polyimide, polyamide, poly vinylphenol, benzocyclobutene, and acrylic; or a siloxane resin can be employed as well as a single-layer structure or a stacked-layer structure of insulating films containing nitrogen or oxygen such as silicon oxide ($SiO_x$), silicon nitride ($SiN_x$), silicon oxynitride ($SiO_xN_y$) (x>y), and silicon nitride oxide ($SiN_xO_y$) (x>y); a film containing carbon such as DLC (diamond like carbon). A siloxane resin is a resin including a Si—O—Si bond. Siloxane includes a skeleton formed by the bond of silicon (Si) and oxygen (O). An organic group containing at least hydrogen (such as an alkyl group or aromatic hydrocarbon) is included as a substituent. In addition, a fluoro group may be used as the substituent. Further, a fluoro group and an organic group containing at least hydrogen may be used as the substituent. In the semiconductor device shown in FIGS. 8A to 8D, the insulating film 807 can be formed directly to cover the gate electrode 805 without providing the insulating film 806.

For the conductive film 808, a single-layer structure or a stacked-layer structure of an element selected from Al, Ni, C, W, Mo, Ti, Pt, Cu, Ta, Au, and Mn or an alloy containing a plurality of the elements can be used. For example, as a conductive film made of an alloy containing some of a plurality of elements, an Al alloy containing C and Ti, an Al alloy containing Ni, an Al alloy containing C and Ni, an Al alloy containing C and Mn, or the like can be used. In addition, in the case of the stacked-layer structure, Al and Ti can be stacked.

Figure 9A:
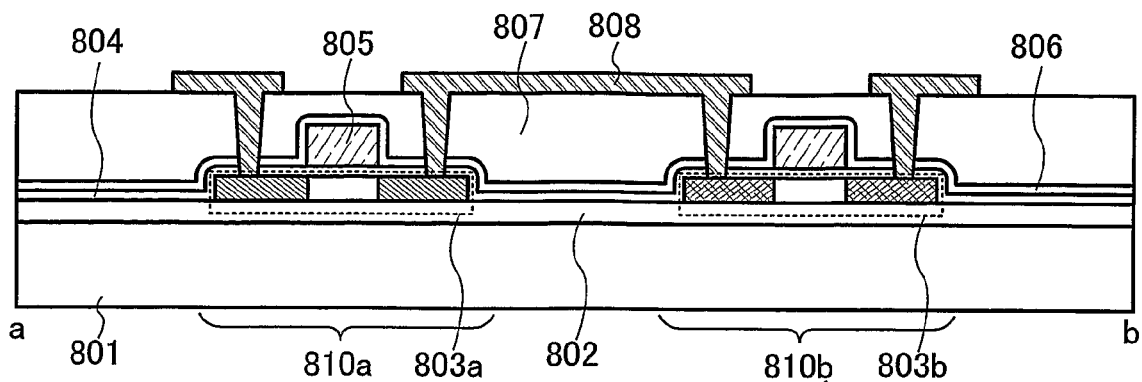
FIGS. 9A to 9C show an example of a manufacturing method of a semiconductor device used for a communication system of the present invention.
Figure 9B:
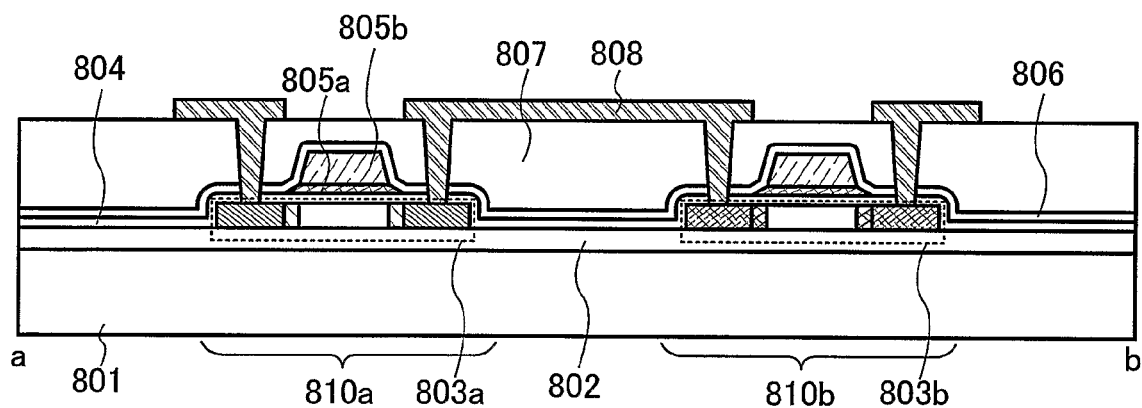
Figure 9C:
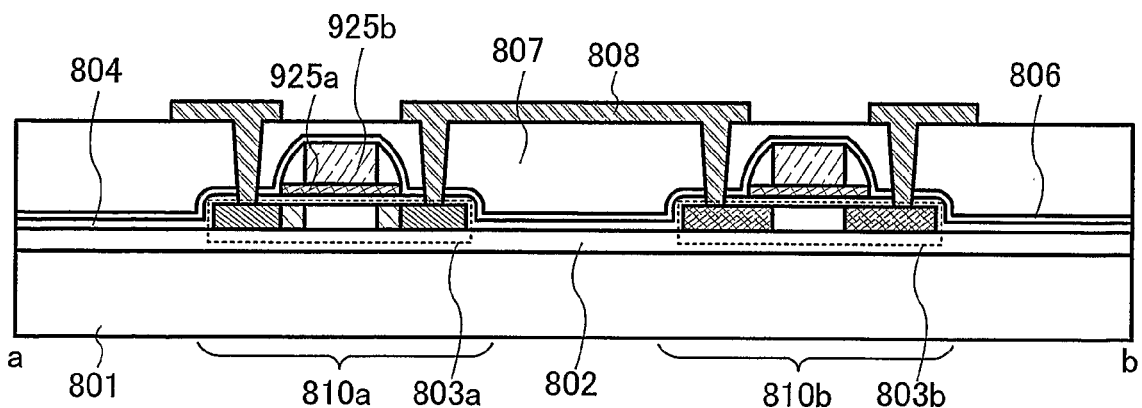

In addition, in FIGS. 8A to 8D, the n-type thin film transistor 810a has a sidewall 811 in contact with the side surface of the gate electrode 805. In addition, the n-type thin film transistor 810a has source and drain regions in the semiconductor film 803a, and an LDD region under the sidewall, which are doped selectively with an impurity element imparting n-type conductivity. The p-type thin film transistor 810b has a sidewall in contact with the side surface of the gate electrode 805. In addition, the n-type thin film transistor 810b has source and drain regions in the semiconductor film 803b which are doped selectively with an impurity element imparting p-type conductivity. Note that the structure of a thin film transistor included in a semiconductor device in the ID card of the present invention is not limited to the above structure. For example, in FIGS. 8A to 8D, an LDD region is provided in the n-type thin film transistor 810a, and an LDD region is not provided in the p-type thin film transistor 810b; however, a structure in which LDD regions are provided in both transistors or a structure in which no LDD regions and no sidewalls are provided in both transistors can be employed (FIG. 9A). The structure of the thin film transistor is not limited to the above described structure, and a single gate structure having one channel formation region and a multi-gate structure such as a double gate structure having two channel formation regions and a triple gate structure having three channel formation regions may be adopted. Further, a bottom gate structure or a dual gate structure having two gate electrodes which are provided above and below the channel forming region each with the gate insulating film interposed therebetween may be employed. In addition, in a case where the gate electrode has a stacked-layer structure, a structure can be employed in which the first conductive film 805a in a lower portion of the gate electrode and the second conductive film 805b formed over the first conductive film 805a are provided, the first conductive film 805a is formed to have a tapered shape, and an impurity region having a lower concentration than the impurity region functioning as the source and drain regions are provided to overlap only the first conductive film (FIG. 9B). In addition, in the case where the gate electrode has a stacked-layer structure, a structure can be employed in which a first conductive film 925a in a lower portion of the gate electrode, and the second conductive film 925b formed over the first conductive film 925a are provided, and a sidewall is provided to be in contact with the side surface of the second conductive film 925b and over the first conductive film 925a (FIG. 9C). Note that in the above structure, the impurity region functioning as the source or drain region of the semiconductor films 803a and 803b can be provided using silicide of Ni, Co, W, or the like.

Before forming the gate insulating film 804 over the semiconductor films 803a and 803b, the surfaces of the semiconductor films 803a and 803b are oxidized or nitrided by a plasma treatment. Thereby, a short-circuit between the gate electrode and the semiconductor film due to coverage defect of the gate insulating film 804 in the end portions of the channel formation regions 851a, 851b, and the like can be prevented. In other words, in a case where the angles of the end portions of the island-shaped semiconductor films are generally orthogonal (85°≤θ≤100°), when the gate insulating film is formed to cover the semiconductor films by a CVD method, a sputtering method, or the like, there is a risk that coverage defects due to breakage of the gate insulating film, or the like may occur at the end portion of the semiconductor film. However, when a plasma treatment is conducted to the surface of the semiconductor film to oxide or nitride the surface, coverage defects and the like of the gate insulating film at the end portion or the semiconductor film can be prevented.

Here, a plasma treatment is conducted over the semiconductor films 803a and 803b, however, the plasma treatment may be also conducted to the gate insulating film 804, the gate electrode 805, and the insulating film 806 to conduct oxidizing or nitriding of the gate insulating film, the gate electrode, and the insulating film. The gate insulating film and the interlayer insulating film formed by the plasma treatment is fine and a defect such as a pin hole is less as compared with a film formed by a CVD method or a sputtering method, and thus, characteristics of a thin film transistor can be improved.

Figure 10A:
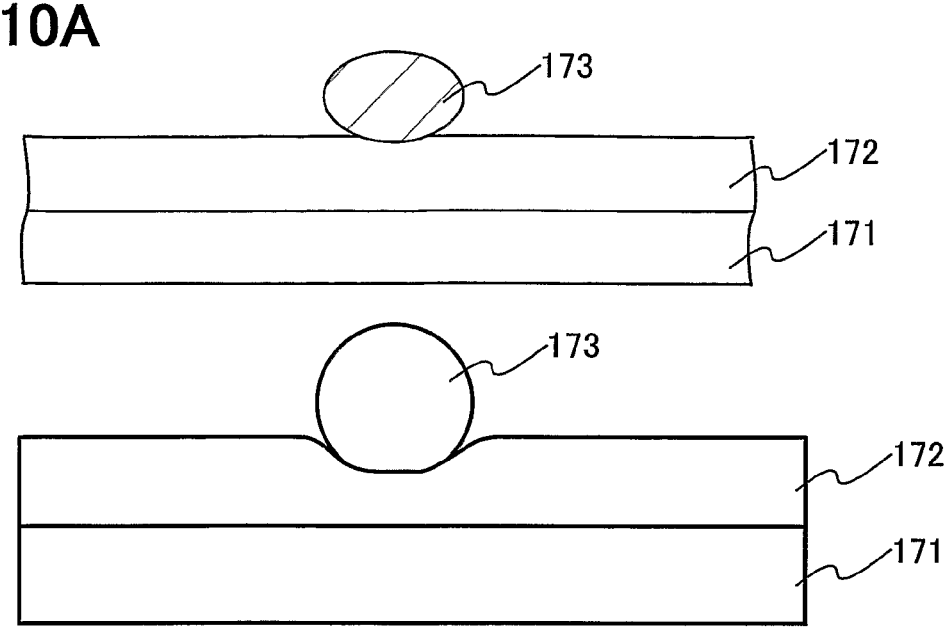
FIGS. 10A and 10B show an example of a manufacturing method of a semiconductor device used for a communication system of the present invention.
Figure 10B:
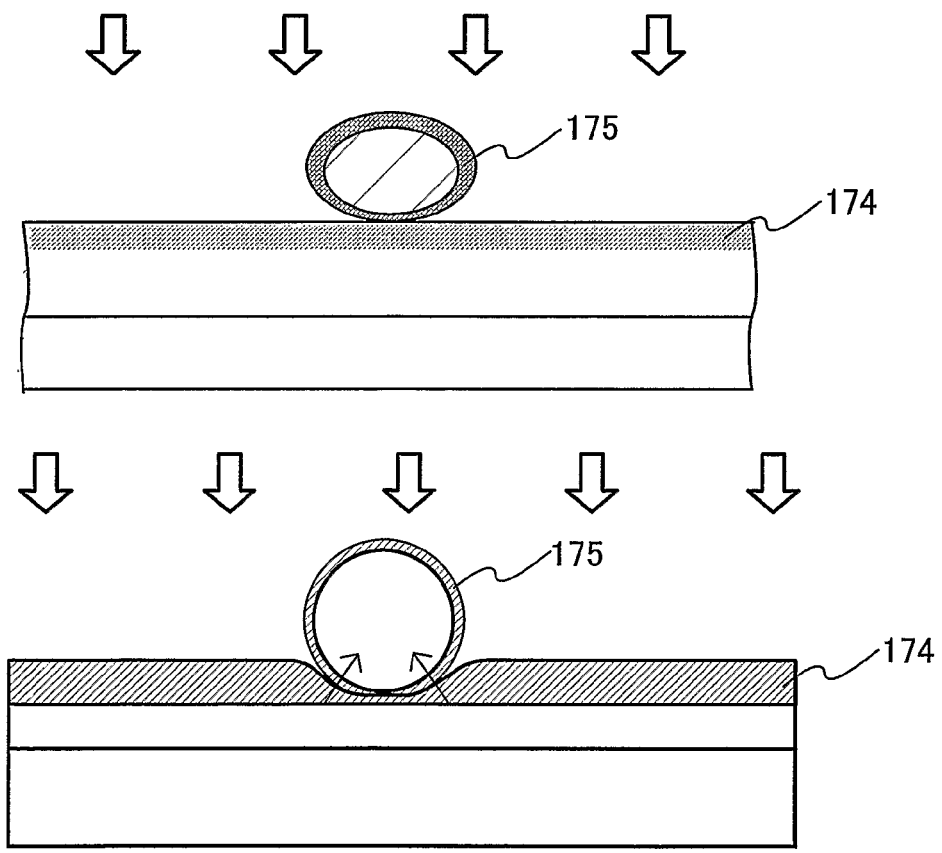

By conducting the plasma treatment in this manner, impurities such as dusts attached to the semiconductor film or the insulating film can be easily removed. In general, in some cases, dusts (also referred to as particles) are attached to the film formed by a CVD method, a sputtering method, or the like. For example, as shown in FIG. 10A, a dust 173 is formed over an insulating film 172 formed by a CVD method, a sputtering method, or the like, which is formed over a film 171 such as an insulating film, a conductive film, or a semiconductor film. In such a case, the insulating film 172 is oxidized or nitrided by the plasma treatment and an oxide film or a nitride film (hereinafter, also referred to as an insulating film 174) is formed over the surface of the insulating film 172. As to the insulating film 174, a portion under the dust 173 as well as a portion in which the dust 173 does not exist is oxidized or nitrided, and thus the volume of the insulating film 174 is increased. Similarly, the surface of the dust 173 is also oxidized or nitrided by the plasma treatment to form an insulating film 175, and as a result, the volume of the dust 173 is also increased (FIG. 10B).

At this time, the dust 173 can be easily removed from the surface of the insulating film 174 by easy cleaning such as brush cleaning. In this manner, by the plasma treatment, even a minute dust attached to the insulating film or the semiconductor film can be removed easily. Note that this is an effect obtained by conducting the plasma treatment, and this is true in other embodiments as well as this embodiment.

As described above, by improving the film quality of the surface of the semiconductor film or the gate insulating film by oxidation or nitriding by the plasma treatment, a fine insulating film with a favorable film quality can be formed. In addition, dusts or the like attached to the surface of the insulating film can be removed easily by cleaning. Consequently, even when the insulating film is made thinner, defects such as a pin hole can be prevented, and miniaturization and higher performance of a semiconductor element such as a thin film transistor can be realized.

Figure 11:
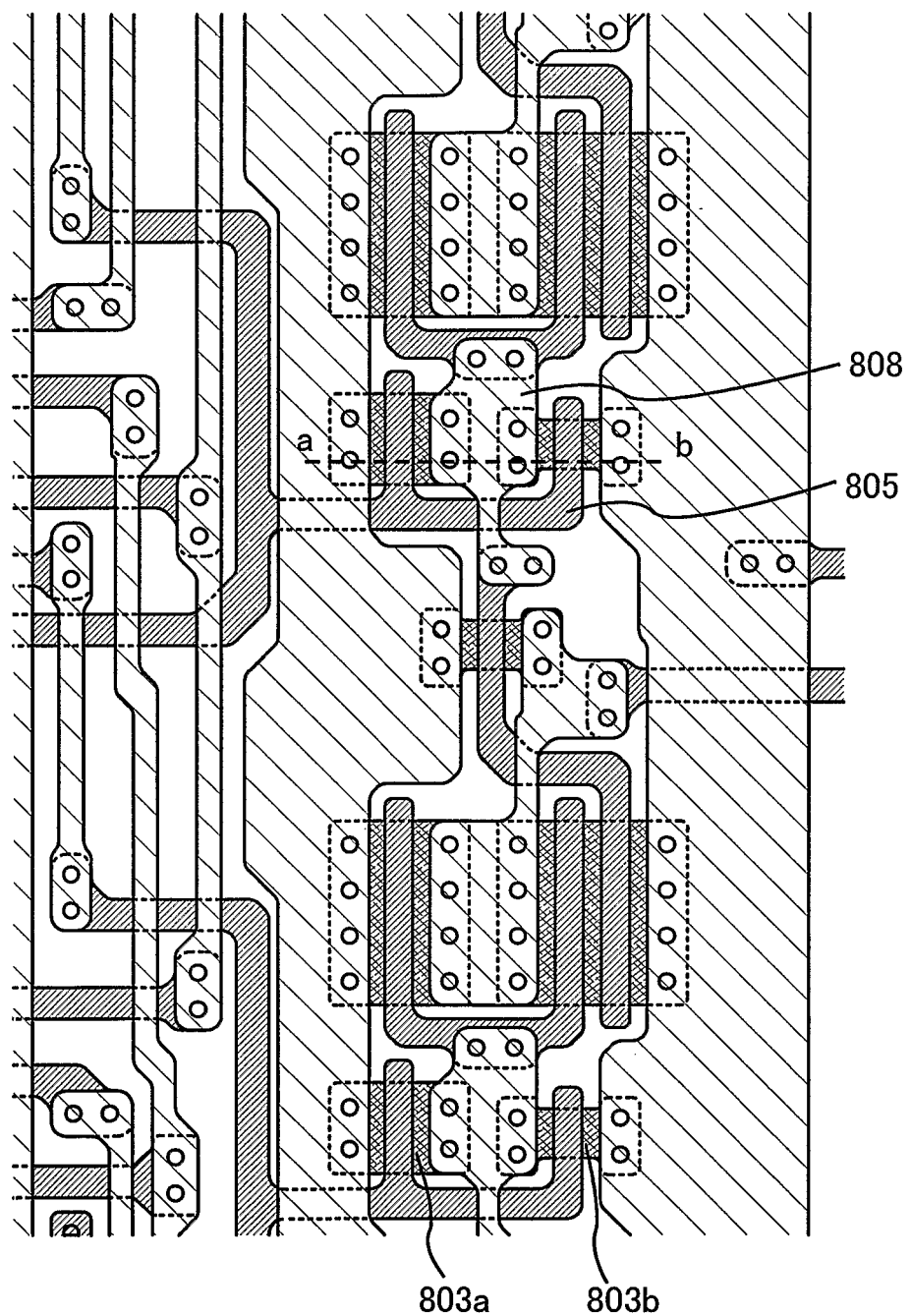
FIG. 11 shows a driver circuit of a semiconductor device used for a communication system of the present invention.

FIG. 11 shows a top view of a driver circuit and a cross sectional view taken along a dotted line a-b in FIG. 11 corresponds to the driver circuit part in FIG. 8D. In such an arrangement of wires, a corner part or in a part where a width of the wire changes may be smoother to have a round shape, so that generation of fine powder due to abnormal electrical discharge can be suppressed when dry etching by plasma is conducted. In addition, even if fine powder is generated (attached to the substrate), an inner side of the corner part makes it possible to wash away the fine powder when cleaning without retaining the fine powder (washing liquids) in the corner. As a result, a yield can be improved significantly. That is, a problem of dust or fine powder in a manufacturing process can be solved. Further, the round corner of the wire allows electrical conduction. In addition, dusts in multiple parallel wires can be washed effectively.

Note that this embodiment can be conducted by freely combining with the foregoing embodiment mode and embodiments.

Embodiment 4

In this embodiment, an electromagnetic wave transmitter/receiver part 201 in the communication system explained in Embodiment Mode 1 is described in details.

Figure 12:
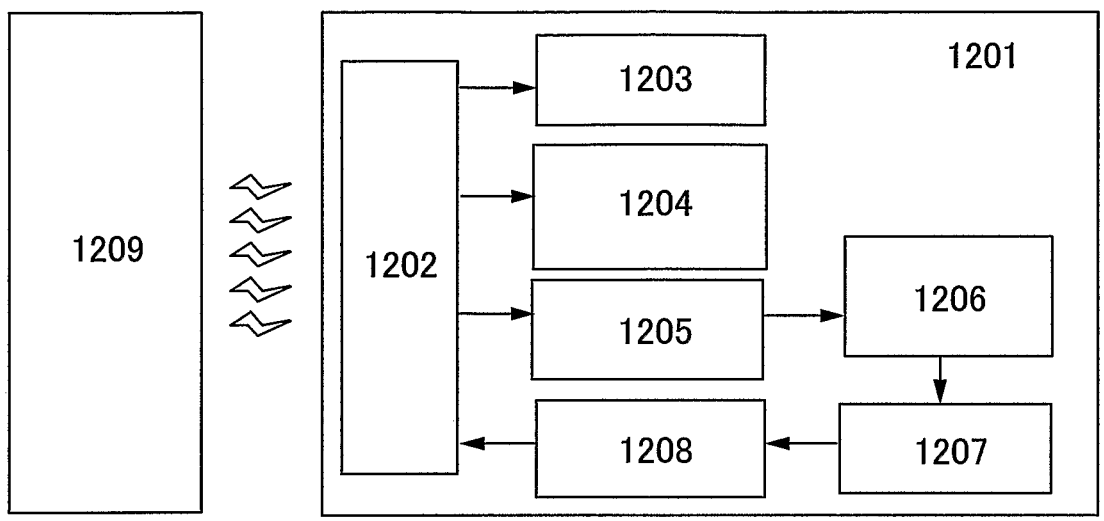
FIG. 12 is a block diagram of a structure of a semiconductor device used for a communication system of the present invention.

FIG. 12 is a structure of a semiconductor device which transmits and receives a signal by wireless communication. A semiconductor device 1201 has a function to conduct wireless communication with a reader/writer 1209. The reader/writer 1209 is connected to a communication line, and has a function to conduct data communication with the semiconductor device 1201 by being controlled by a computer or by being a terminal of a computer. In addition, the reader/writer 1209 may have a structure which conducts communication with the semiconductor device 1201 independently from a network.

The semiconductor device 1201 has a resonance circuit 1202, a power supply circuit 1203, a clock generation circuit 1204, a demodulation circuit 1205, a control circuit 1206, a memory part 1207, and an encoding and modulation circuit 1208. The resonance circuit 1202 and the power supply circuit 1203 are formed by an analog circuit, and the control circuit 1206 and the memory part 1207 are formed by a digital circuit. The clock generation circuit 1204, the demodulation circuit 1205, and the encoding and modulation circuit 1208 have analog parts and digital parts.

In the semiconductor device 1201, the resonance circuit 1202 is connected to each of the power supply circuit 1203 and the clock generation circuit 1204. The analog parts in the demodulation circuit 1205 and the encoding and modulation circuit 1208 are connected to the resonance circuit 1202. The digital parts in the demodulation circuit 1205 and the encoding and modulation circuit 1208 are connected to the memory part 1207 through the control circuit 1206. The power supply circuit 1203 and the clock generation circuit 1204 are connected to each functional circuit in the semiconductor device shown in FIG. 2. Note that the control circuit 1206 and the memory part 1207 can be replaced by the central processing unit 205 and the volatile memory 208 shown in FIG. 2, respectively.

Figure 13:
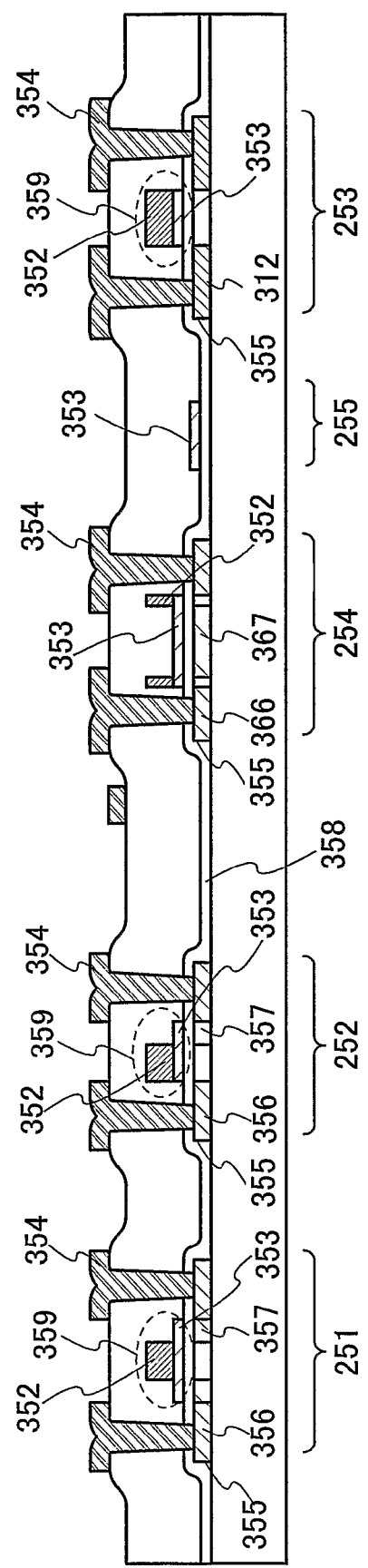
FIG. 13 shows an example of a semiconductor device used for a communication system of the present invention.

These circuits are formed to include transistors. The transistor can be formed by a thin film transistor (TFT) besides a MOS transistor formed in a single crystalline substrate. FIG. 13 is a view showing a cross-sectional structure of a transistor which forms these circuits. FIG. 13 shows an n-channel transistor (n-channel TFT) 251, an n-channel transistor 252, a capacitor 254, a resistor 255, and a p-channel transistor 253. Each transistor is provided with a semiconductor layer 355, an insulating layer 358, and a gate electrode 359. The gate electrode 359 is formed by a stacked-layer structure of a first conductive layer 353 and a second conductive layer 352. FIGS. 14A to 14E are top views corresponding to the transistors, the capacitor, and the resistor, which can be referred together with FIG. 13.

In FIG. 13, the n-channel TFT 251 has the semiconductor layer 355 in the channel length direction (the flowing direction of carriers) that includes impurity regions 356 forming source and drain regions each of which is connected to a wire 354 and impurity regions 357 each doped at a lower concentration than that of the impurity regions 356. The impurity region 357 is also called a lightly doped drain (LDD). In the case of the n-channel TFT 251, the impurity regions 356 and 357 are doped with an impurity imparting n-type conductivity such as phosphorus. The LDD is formed so as to prevent hot electron deterioration and a short channel effect.

Figure 14A:
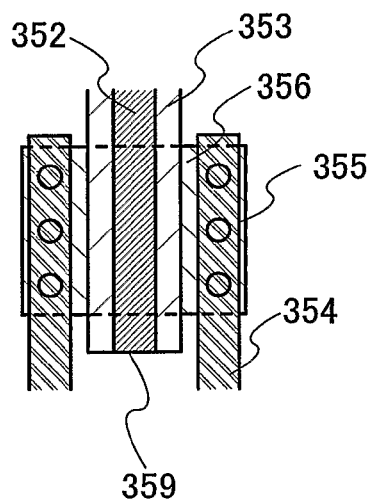
FIGS. 14A to 14E show top views of a semiconductor device used for a communication system of the present invention.

As shown in FIG. 14A, in the gate electrode 359 of the n-channel TFT 251, the first conductive layer 353 is formed so as to extend on both sides of the second conductive layer 352. In that case, the thickness of the first conductive layer 353 is thinner than that of the second conductive layer. The thickness of the first conductive layer 353 is set so as to transmit ion species accelerated in an electric filed of 10 to 100 kV. The impurity region 357 is formed so as to overlap the first conductive layer 353 of the gate electrode 359. That is, an LDD region which overlaps the gate electrode 359 is formed. In this structure, the impurity region 357 is formed in a self alignment manner by adding an impurity imparting one conductivity type through the first conductive layer 353 using the second conductive layer 352 as a mask. That is, the LDD which overlaps the gate electrode is formed in a self alignment manner.

A transistor having LDDs on both sides of the channel formation region is used as a transistor such as a rectifying TFT in the power supply circuit 1203 in FIG. 12 and a transistor in a transmission gate (also referred to as an analog switch) used in a logical circuit. In such TFTs, both positive and negative voltages are applied to the source and the drain electrodes, therefore, LDDs are preferably formed on both sides of the channel formation region.

Figure 14B:
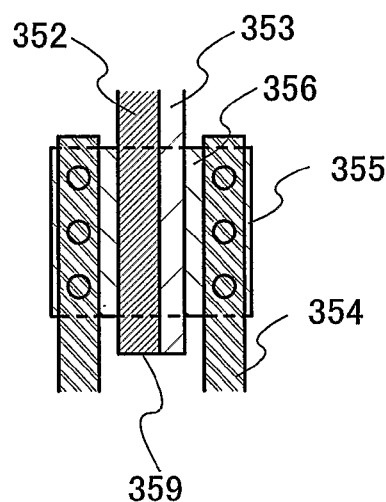

In FIG. 13, the n-channel TFT 252 has the semiconductor layer 355 that includes the impurity regions 356 forming source and drain regions and the impurity region 357 doped at a lower concentration than that of the impurity regions 356. The impurity region 357 is formed on one side of the channel formation region so as to be in contact with one of the impurity regions 356. As shown in FIG. 14B, in the gate electrode 359 of the n-channel TFT 252, the first conductive layer 353 is formed so as to extend on one side of the second conductive layer 352. In such a structure also, the LDD can be formed in a self alignment manner by adding an impurity imparting one conductivity type through the first conductive layer 353 using the second conductive layer 352 as a mask.

A transistor having an LDD on one side of the channel formation region may be used as a transistor in which either a positive voltage or a negative voltage is applied between source and drain electrodes. Specifically, the transistor may be applied to a transistor forming a logical gate such as an inverter circuit, a NAND circuit, a NOR circuit, and a latch circuit, a transistor forming an analog circuit such as a sense amplifier, a constant voltage generating circuit, and a VCO.

Figure 14C:
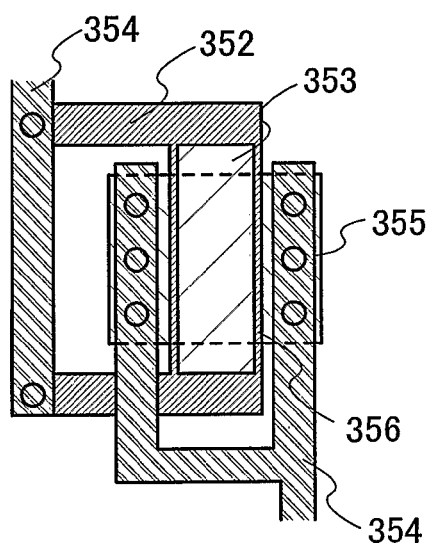
Figure 14D:
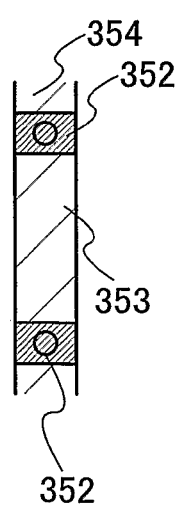
Figure 14E:
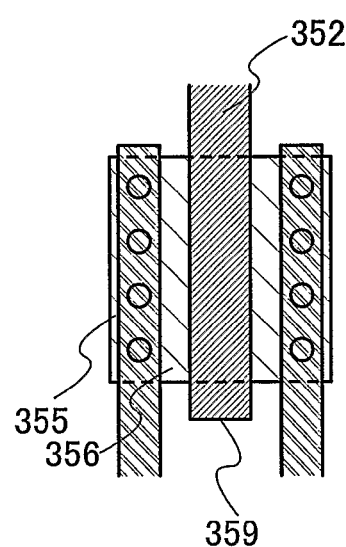

As shown in FIG. 13, the capacitor 254 is formed so that the insulating layer 358 is interposed between a first conductive layer 353 and the semiconductor layer 355. The semiconductor layer 355 in the capacitor 254 has the impurity regions 366 and 367. The impurity region 367 is formed in the semiconductor layer 355 so as to overlap the first conductive layer 353. The impurity region 366 is connected to the wire 354. Since the impurity region 367 is doped with an impurity of one conductivity type through the first conductive layer 353, the concentrations of the impurities contained in the impurity regions 366 and 367 may be the same or different. In any case, in the capacitor 254, the semiconductor layer 355 serves as an electrode; therefore the semiconductor layer 355 is preferably doped with an impurity imparting one conductivity type to lower the resistance thereof. In addition, as shown in FIG. 14C, the first conductive layer 353 can sufficiently operate as an electrode by using the second conductive layer 352 as an auxiliary electrode. Thus, the capacitor 254 can be formed in a self alignment manner by combining the first conductive layer 353 and the second conductive layer 352 to form a multiple electrode structure.

The capacitor is used as storage capacitance of the power supply circuit 1203 or resonance capacitance of the resonance circuit 1202. Specifically, the resonance capacitance is required to function as capacitance regardless of whether a voltage between the two terminals of the capacitor is positive or negative, since both positive voltage and negative voltage are applied between the two terminals of the capacitor.

In FIG. 13, the resistor 255 is formed using the first conductive layer 353. The first conductive layer 353 is formed so as to have a thickness of 30 to 150 nm, the width or the thickness of the first conductive layer 353 can be appropriately set to form the resistor.

The resistor 255 is used as a resistance load included in a modulation circuit 558 in FIG. 12. Alternatively, the resistor may be used as a load in the case where current is controlled by a VCO or the like. The resistor 255 may be formed with a semiconductor layer containing an impurity element at a high concentration or a metal layer with a thin thickness. A metal layer is preferable to a semiconductor layer because the resistance value of the metal layer depends on a film thickness and a film quality while the resistance value of the semiconductor layer depends of a film thickness, a film quality, a concentration of an impurity, an activation ratio, and the like; therefore, variation in the resistance value of the metal layer is smaller than that of the semiconductor layer.

In FIG. 13, the p-channel transistor 253 has an impurity region 312 in the semiconductor layer 355. The impurity region 312 forms source and drain regions each of which is connected to the wire 354. The gate electrode 359 has a structure in which the first conductive layer 353 and the second conductive layer 352 overlap each other. The p-channel transistor 253 is a transistor having a single drain structure in which an LDD is not formed. When the p-channel transistor 253 is formed, the impurity region 312 is doped with an impurity for imparting p-type conductivity, such as boron. On the other hand, when the impurity region 312 is doped with phosphorus, an n-channel transistor having a single drain structure can be formed.

To one or both of the semiconductor layer 355 and the gate insulating layer 358, an oxidizing or nitriding treatment may be conducted using high-density plasma which is excited with a microwave and with an electron temperature of 2 eV or less, ion energy of 5 eV or less, and an electron density of approximately 10 to $10^{13}/cm^3$. At this time, treatment is conducted with a substrate temperature of 300 to 450° C. and in an oxidizing atmosphere ($O_2$, $N_2O$, or the like) or a nitriding atmosphere ($N_2$, $NH_3$, or the like), thereby a defect level of an interface between the semiconductor layer 355 and the insulating layer 358 can be lowered. In addition, by conducting the treatment to the insulating layer 358, the insulating layer 358 can be fine. In other words, generation of a charged defect and change in a threshold voltage of a transistor can be suppressed. In a case where the transistor is driven at a voltage of 3 V or less, the insulating layer 358 which is oxidized or nitrided by this plasma treatment is preferable to be used as the gate insulating layer. In a case where a transistor is driven at a voltage of 3 V or more, the gate insulating layer can be formed by combing the insulating layer which is formed over a surface of the semiconductor layer 355 by this plasma treatment and the insulating layer which is stacked by a CVD method (a plasma CVD method or a thermal CVD method). In the same manner, this insulating layer can be utilized as a dielectric layer of the capacitor 254. In this case, the insulating layer formed by this plasma treatment is formed to have a thickness of 1 to 10 nm and to be fine; therefore, a capacitor having a large charge capacitance can be formed.

As described with reference to FIGS. 13 and 14A to 14E, an element with various kinds of structures can be formed by combing conductive layers having different film thicknesses. A region in which only the first conductive layer is formed and a region in which the first and the second conductive layers are stacked can be formed by using a photomask or a reticle which is formed by a diffraction grating pattern or an auxiliary pattern which has a semipermeable membrane with a function of reducing light intensity. That is, in a photolithography process, when a photoresist is exposed to light, the amount of light which transmits a photomask is adjusted so that a developed resist mask has a varied thickness. In that case, a slit which is equal to or below the theoretical resolution limitation may be formed in the photomask or the reticle so that a resist having the foregoing complicated shape is formed. In addition, a mask pattern formed by a photoresist material may be changed in the shape by being baked at about 200° C. after development.

In addition, by using a photomask or a reticle which is formed by a diffraction grating pattern or an auxiliary pattern which has a semipermeable membrane with a function of reducing light intensity, the region where only the first conductive layer is formed and the region where the first conductive layer and the second conductive layer are stacked can be continuously formed. As shown in FIG. 14A, a region in which only the first conductive layer is formed can be selectively formed over the semiconductor layer. Such a region is effective over the semiconductor layer but is not necessary in other regions (a wire region connected to the gate electrode). By using the photomask or the reticle, a region in which only the first conducive region is not formed in the wire region; therefore, wire density can be substantially increased.

In FIGS. 13 and 14A to 14E, the first conductive layer is formed from a high melting point metal such as tungsten (W), chromium (Cr), tantalum (Ta), tantalum nitride (TaN), or molybdenum (Mo); or an alloy or a compound mainly containing a high melting point metal to have a thickness of 30 to 50 nm. The second conductive layer is formed from a high melting point metal such as tungsten (W), chromium (Cr), tantalum (Ta), tantalum nitride (TaN), or molybdenum (Mo); or an alloy or a compound mainly containing a high melting point metal to have a thickness of 300 to 600 nm. For example, the first conductive layer and the second conductive layer are formed from different conductive materials so that the etching rates are different from each other in a subsequent etching step. For example, the first conductive layer can be formed from TaN and the second layer formed from a tungsten film.

In this embodiment, a transistor, a capacitor, and a resistor, each of which has a different electrode structure can be formed in one processing step by using a photomask or a reticle which is formed by a diffraction grating pattern or an auxiliary pattern which has a semipermeable membrane with a function of reducing light intensity. Therefore, elements with different structures can be formed without increasing the number of steps and can be integrated according to characteristics of the circuit.

Note that this embodiment can be conducted by freely combining with the foregoing embodiment mode and embodiments.

Embodiment 5

As one of the components forming the semiconductor device shown in FIG. 2, the volatile memory 208 connected to the central processing unit (CPU) 205 is explained with reference to FIGS. 15A, 15B, 16A, 16B, 17A, and 17B.

Figure 15A:
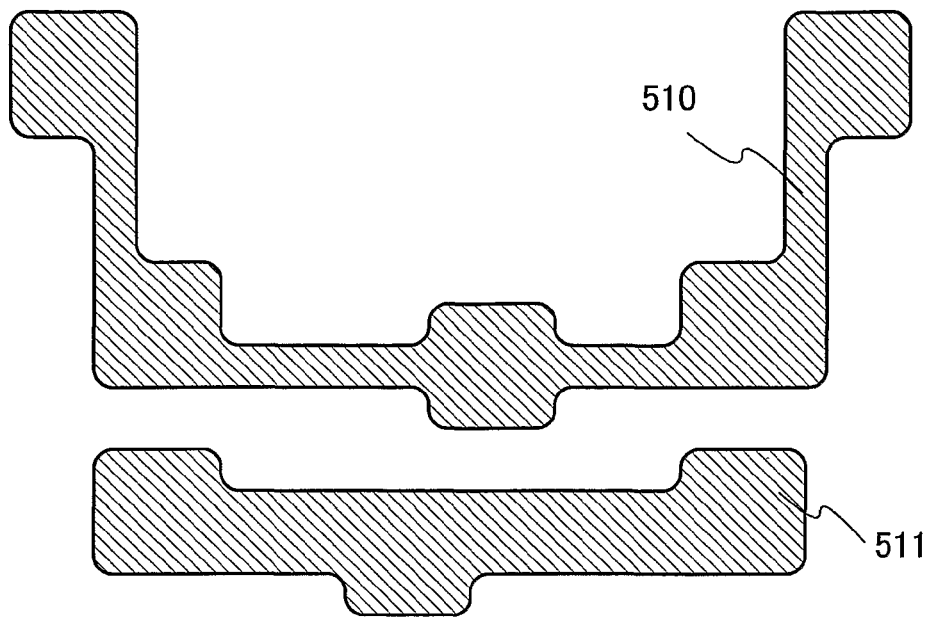
FIGS. 15A and 15B show structures of a semiconductor device used for a communication system of the present invention.

Semiconductor layers 510 and 511 shown in FIG. 15A are preferably formed from silicon or a crystalline semiconductor containing silicon. For example, a polycrystalline silicon or single crystalline silicon which is formed by crystallizing a silicon film by laser annealing or the like is applied. Besides, a metal oxide semiconductor, amorphous silicon, or an organic semiconductor which shows semiconductor characteristics can be applied.

In any case, a semiconductor layer which is formed first is formed over the entire surface or a portion (a region which is larger than a region which is specified to be a semiconductor region in a transistor) of a substrate having an insulating surface. Then, a mask pattern is formed over the semiconductor layer by photolithography. The semiconductor layer is etched using the mask pattern to form the predetermined island-shaped semiconductor layers 510 and 511 including source and drain regions and a channel formation region of a TFT. The semiconductor layers 510 and 511 are formed so as to have an appropriate layout.

Figure 15B:
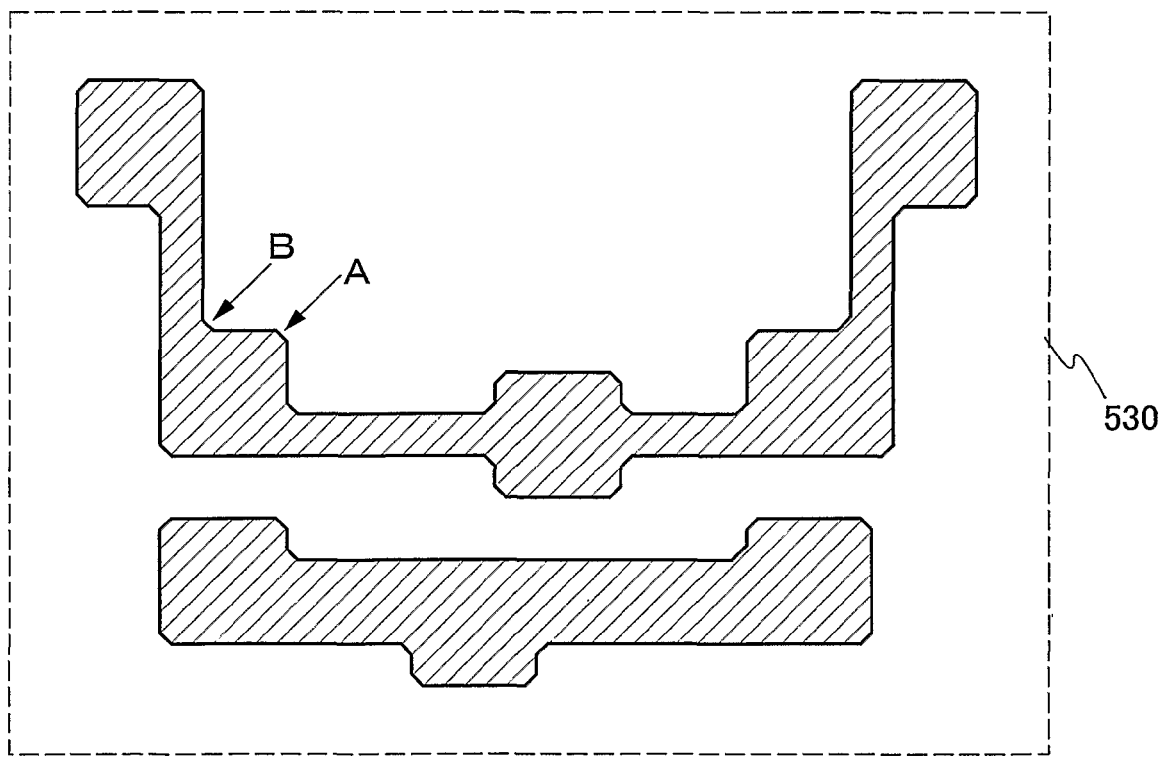

The photomask for forming the semiconductor layers 510 and 511 shown in FIG. 15A has a mask pattern 530 shown in FIG. 15B. The mask pattern 530 differs depending on whether a resist used in a photolithography step is a positive type or a negative type. When a positive type resist is used, the mask pattern 530 shown in FIG. 15B is formed as a light shielding portion. The mask pattern 530 has a polygon shape in which a top A is removed. In addition, in an inner side of a corner part B, the mask pattern bends a plurality of times so as not to make a right angle. That is, in this photomask pattern, a corner that is a right triangle is removed so that one side of the right triangle is, for example, 10 μm or less.

The shape of the mask pattern 530 shown in FIG. 15B is reflected in the semiconductor layers 510 and 511 shown in FIG. 15A. In that case, the shape which is similar to the mask pattern 530 may be transcribed. Alternatively, the shape may be transcribed so that the corner of the transcribed pattern has a rounder shape than the mask pattern 530. That is, a round part where the pattern shape is smoother than the mask pattern 530 may be provided.

Figure 16A:
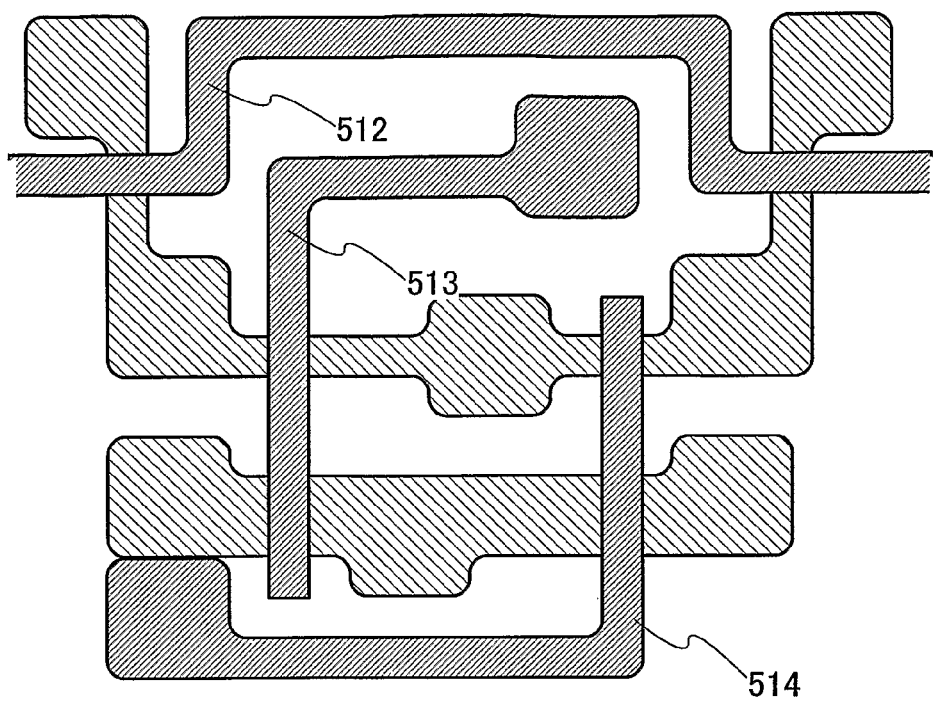
FIGS. 16A and 16B show structures of a semiconductor device used for a communication system of the present invention.

An insulating layer including silicon oxide or silicon nitride in at least one portion thereof is formed over the semiconductor layers 510 and 511. One purpose of forming the insulating layer is to function as a gate insulating layer. As shown in FIG. 16A, gate wires 512 to 514 are formed to overlap the semiconductor layer partially. The gate wire 512 is formed corresponding to the semiconductor layer 510 while the gate wire 513 is formed corresponding to the semiconductor layers 510 and 511. Besides, the gate wire 514 is formed corresponding to the semiconductor layers 510 and 511. The gate wire is formed by forming a metal layer or a semiconductor layer having high conductivity, and a shape of the gate wire is formed by photolithography over the semiconductor layer.

Figure 16B:
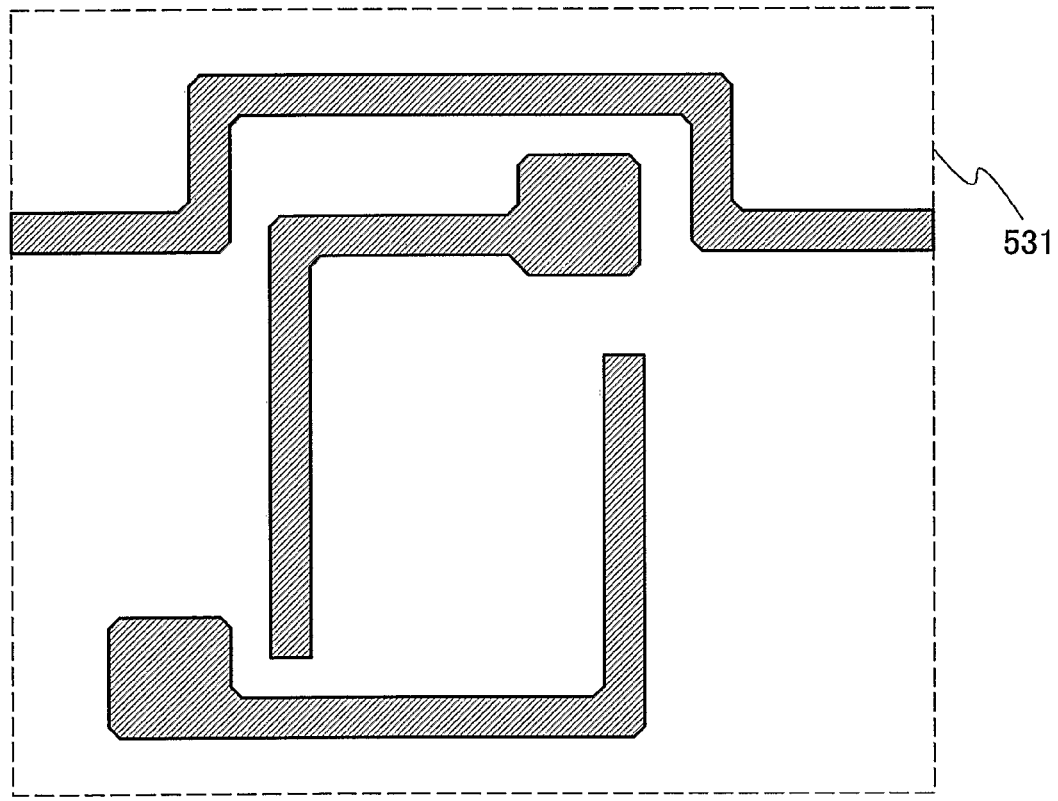

A photomask used for forming the gate wire has a mask pattern 531 shown in FIG. 16B. In the mask pattern 531, a corner that is a right triangle is removed so that one side of the right triangle is 10 μm or less, or one-fifth to half the width of the wire, thereby the corner part is rounded. The shape of the mask pattern 531 shown in FIG. 16B is reflected to the gate wires 512 to 514 shown in FIG. 16A. In that case, the shape which is similar to the mask pattern 531 may be transcribed. Alternatively, the shape may be transcribed so that the corner in the gate wires 512 to 514 has a rounder shape than the mask pattern 531. That is, a round part where the pattern shape is smoother than the mask pattern 531 may be provided. In other word, the corner in the gate wires 512 to 514 is removed by one-fifth to half the width of the wiring layer in order to have a round corner part. In an outer side of the corner part, generation of fine powder due to abnormal electrical discharge can be suppressed when dry etching by plasma is conducted. In addition, even if fine powder is generated (attached to the substrate), an inner side of the corner part makes it possible to wash away the fine powder when cleaning without retaining fine powder (washing liquids) in the corner. As a result, a yield improves significantly.

An interlayer insulating layer is formed after forming the gate wires 512 to 514. The interlayer insulating layer is formed from an inorganic insulating material such as silicon oxide or an organic insulating material such as polyimide or an acryl resin. An insulating layer such as silicon nitride or silicon nitride oxide may be formed between the interlayer insulating layer and the gate wires 512 to 514. In addition, an insulating layer such as silicon nitride or silicon nitride oxide may also be formed over the interlayer insulating layer. The insulating layer prevents contamination of the semiconductor layer and the gate insulating layer due to an impurity which is not favorable to a TFT, such as exogenous metal ion and moisture.

Figure 17A:
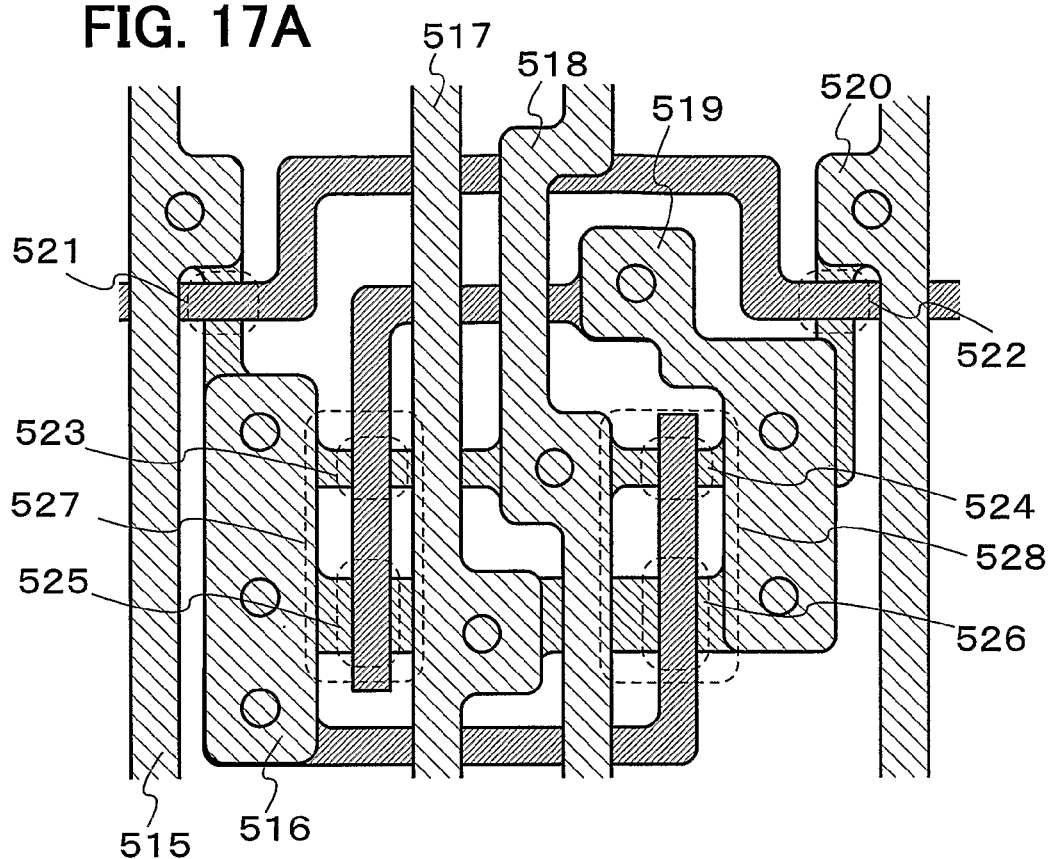
FIGS. 17A and 17B show structures of a semiconductor device used for a communication system of the present invention.

In the interlayer insulating layer, an opening is formed in a predetermined position. For example, the opening is formed corresponding to the gate wire and the semiconductor layer placed blow. A wire layer formed of a single layer or a plurality of layers of metal or a metal compound is etched into a predetermined pattern with a mask pattern formed by photolithography. Then, as shown in FIG. 17A, wires 515 to 520 are formed to overlap the semiconductor layer partially. The wire connects specific elements. The wire connecting an element to another element is not straight. The wire bends due to restriction of a layout. In addition, the width of the wire changes in a contact part or another region. In the contact part, the width of the wire is widened in a part of the contact part where the contact hole is equal to or wider than the width of the wire.

Figure 17B:
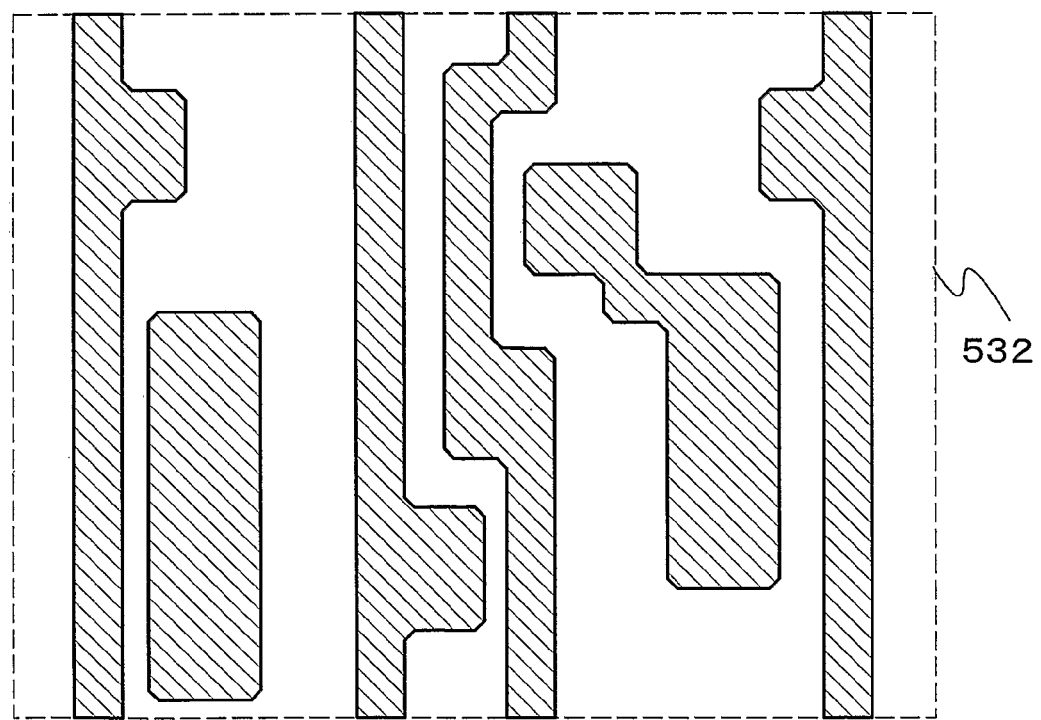
Figure 18:
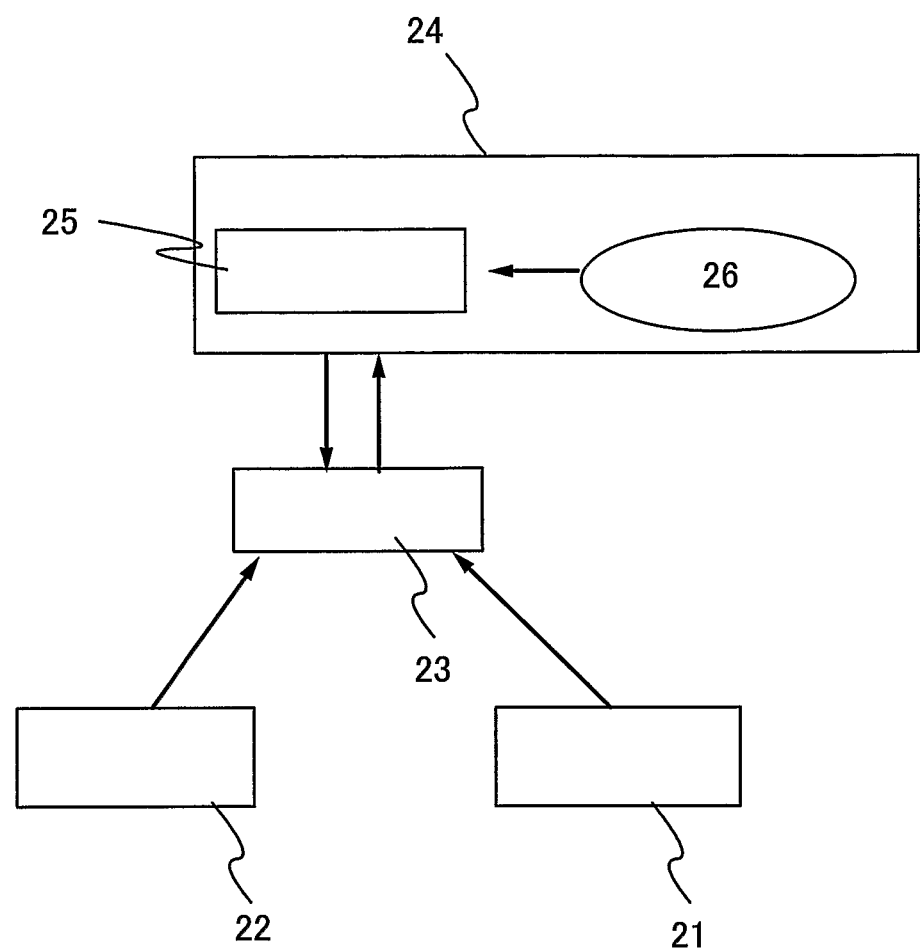
FIG. 18 is a flow chart showing a conventional personal authentication system.
Figure 19:
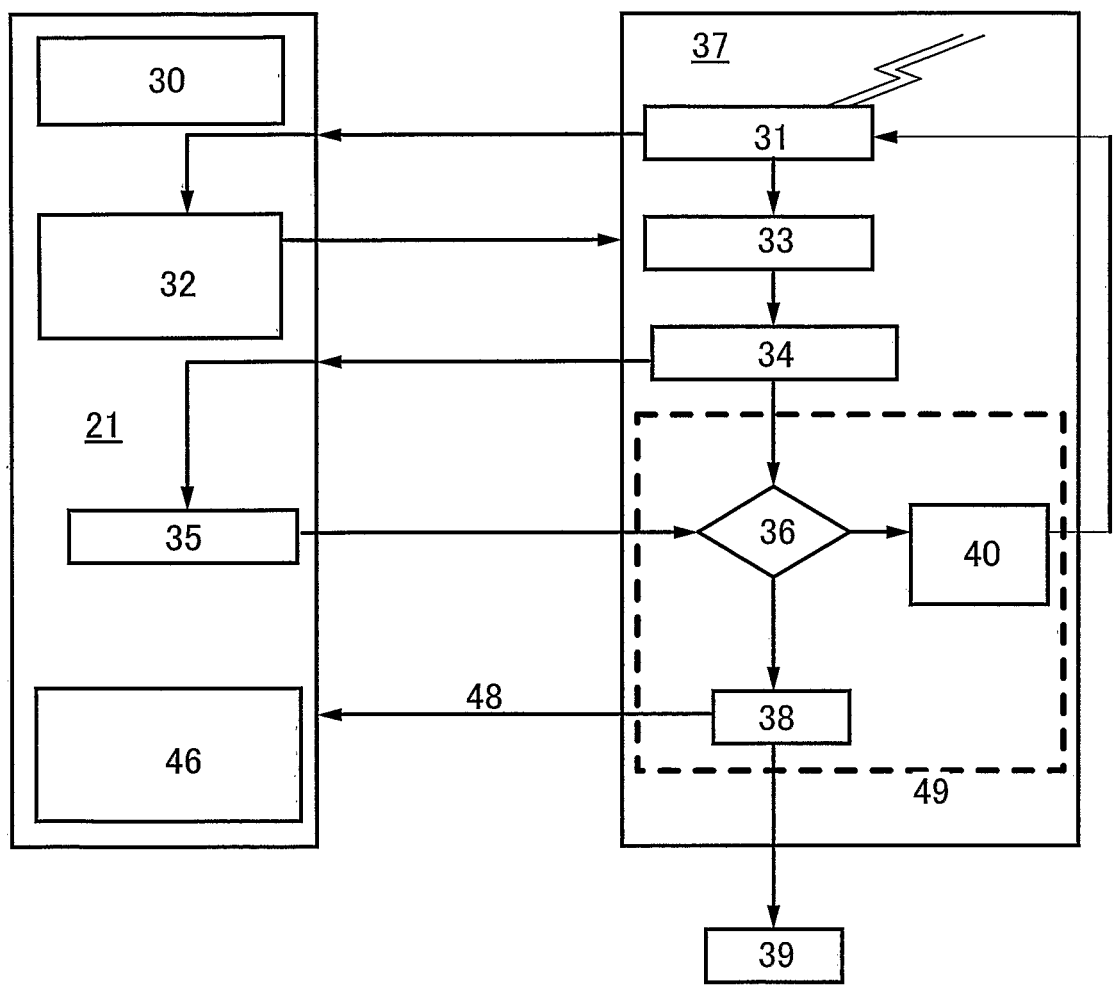
FIG. 19 is a flow chart showing a conventional personal authentication system.
Figure 20:
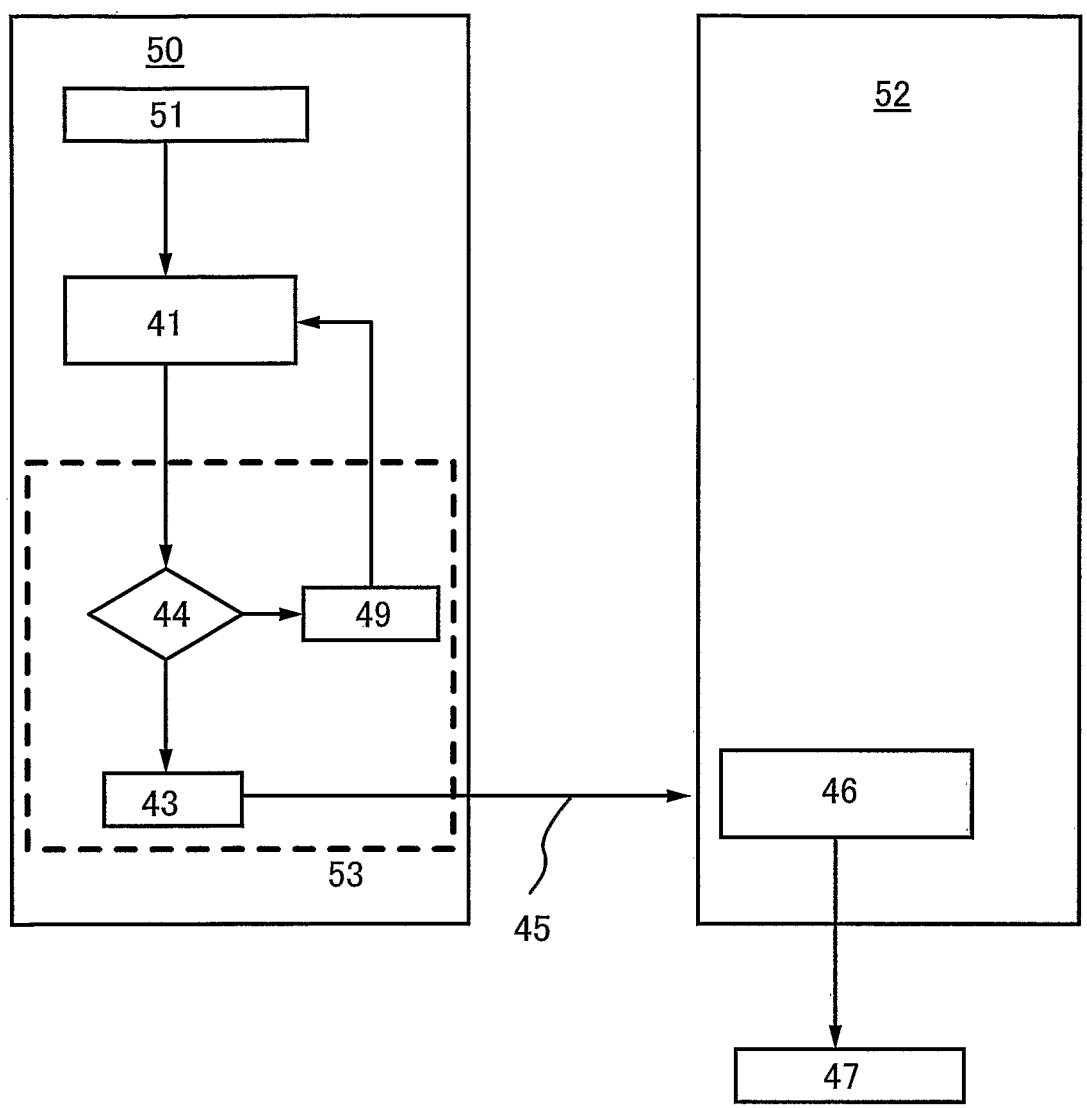
FIG. 20 is a flow chart showing a conventional personal authentication system.

A photomask for forming the wires 515 to 520 has a mask pattern 532 shown in FIG. 17B. In this case, the wire also has a pattern where a corner that is a right triangle in each corner part bent into an L shape is removed so that one side of the right triangle is 10 μm or less, or one-fifth to half the width of the wiring layer, thereby the corner part is rounded. That is, the circumference of the wire layer in the corner part is curved when seen from above. Specifically, in order to form a round circumference of the corner part, a part of the wiring layer is removed, which corresponds to an isosceles right triangle having two first straight lines that are perpendicular to each other making the corner part, and a second straight line that makes an angle of about 45 degrees with the two first straight lines. When removing the triangle, two obtuse angles are formed in the wire layer. At this time, the wiring layer is preferably etched by appropriately adjusting the etching conditions and/or a mask design so that a curved line in contact with the first straight line and the second straight line is formed in each obtuse angle part. Note that the length of the two sides of the isosceles right triangle, which are equal to each other, is equal to or longer than one-fifth the width of the wiring layer and equal to or shorter than half the width of the wiring layer. In addition, the inner circumference of the corner part is also made round in accordance with the outer circumference of corner part. When the wiring layer and the conductive layer are thus disposed so that the corner and the portion where the wire width changes are curved, generation of fine particles due to abnormal discharge can be suppressed in dry etching using plasma. In such a wire, in an outer side of the corner part, generation of fine powder due to abnormal electrical discharge can be suppressed when dry etching by plasma is conducted. In addition, even if fine powder is generated (attached to the substrate), an inner side of the corner part makes it possible to wash away the fine powder when cleaning without retaining the fine powder (washing liquids) in the corner. As a result, a yield improves significantly. As a result a yield improves significantly. Further, the round corner of the wire allows electrical conduction. In addition, dusts in multiple parallel wires can be washed effectively.

In FIG. 17A, n-channel transistors 521 to 524 and p-channel transistors 525 and 526 are formed. Each of the n-channel transistor 523 and the p-channel transistor 525, and the n-channel transistor 524 and the p-channel transistor 526 forms an inverter. A circuit including these six transistors forms the volatile memory 208. An insulating layer such as silicon nitride and silicon oxide may be formed over the transistors.

Note that this embodiment can be conducted by freely combining with the foregoing embodiment mode and embodiments.

This application is based on Japanese Patent Application serial no. 2005-158301 filed in Japan Patent Office on May, 31, in 2005, the entire contents of which are hereby incorporated by reference.

EXPLANATION OF REFERENCE

11: user, 12: ID card, 13: terminal, 14: management server, 15: sampling, 16: check, 21: user, 22: ID card, 23: terminal, 24: management server, 25: check, 31: requirement. 32: transmission, 33: identification, 34: requirement, 35: input, 36: check, 39: unlocking, 41: sampling, 44: check, 45: transmission, 46: reception, 47: call start, 171: film, 172: insulating film, 173: dust, 174: insulating film, 175: insulating film, 200: semiconductor device (ID card), 201: sensor, 202: A/D converter circuit, 203: semiconductor device (memory), 204: auxiliary power unit, 205: central processing unit (CPU), 206: encryption circuit, 207: decryption circuit, 208: volatile memory, 210: electromagnetic wave transmitter/receiver part, 211: antenna (resonance circuit), 213: clock generation circuit, 214: demodulation circuit, 215: modulation circuit, 216: electromagnetic wave transmitter/receiver part, 217: power supply circuit, 251: n-channel transistor (n-channel TFT), 252: n-channel transistor (n-channel TFT), 253: p-channel transistor, 254: capacitor, 255: resistor, 312: impurity region, 352: conductive layer, 353: conductive layer, 354: wire, 355: semiconductor layer, 356: impurity region, 357: impurity region, 358: insulating layer, 359: gate electrode, 366: impurity region, 367: impurity region, 401: fingerprint image data, 403: straight line, 510: semiconductor layer, 512: gate wire, 513: gate wire, 514: gate wire, 515: gate wire, 521: n-channel transistor, 523: n-channel transistor, 524: n-channel transistor, 525: p-channel transistor, 526: p-channel transistor, 530: mask pattern, 531: mask pattern, 532: mask pattern, 558: modulation circuit, 702a: key A, 702b: key A', 801: substrate, 802: insulating film, 803a: semiconductor film, 803b: semiconductor film, 804: gate insulting film, 805: gate electrode, 805a: conductive film, 805b: conductive film, 806: insulating film, 807: insulating film, 808: conductive film, 810a: thin film transistor, 810b: thin film transistor, 821a: insulating film, 821b: insulating film, 925a: conductive film, 925b: conductive film, 1201: semiconductor device, 1202: resonance circuit, 1203: power supply circuit, 1204: clock generation circuit, 1205: demodulation circuit, 1206: control circuit, 1207: memory part, 1208: encoding and modulation circuit, 1209: reader/writer.

The invention claimed is:

1. An authentication method in a communication system for identifying with a card a user of the card, comprising:

storing a plurality of correspondence tables in the card, wherein one of the plurality of correspondence tables to be used can be changed;

storing in the card a reference password which is formed by converting biometrics of an authorized user using the one of the plurality of correspondence tables in the card;

reading with the card biometrics of the user of the card;

converting the biometrics of the user into a password using the one of the plurality of correspondence tables in the card; and checking the password against the reference password in the card, wherein the card and the user are authenticated if the password and the reference password match in the checking step.

2. An authentication method in a communication system for identifying with a card a user of the card, comprising:

storing a plurality of correspondence tables in the card, wherein one of the plurality of correspondence tables to be used can be changed;

storing in the card a reference password which is formed by converting biometrics of an authorized user using the one of the plurality of correspondence tables in the card;

reading with the card biometrics of the user of the card using power supplied by communication between the card and a terminal;

converting the biometrics of the user into a password using the one of the plurality of correspondence tables in the card; and checking the password against the reference password in the card, wherein the card and the user are authenticated if the password and the reference password match in checking the step.

3. An authentication method in a communication system for identifying with a card a user of the card, comprising:

storing a plurality of correspondence tables in the card, wherein one of the plurality of correspondence tables to be used can be changed;

storing in the card a reference password which is formed by converting biometrics of an authorized user using the one of the plurality of correspondence tables in the card;

reading with the card biometrics of the user of the card;

converting the biometrics of the user into a password using the one of the plurality of correspondence tables in the card;

checking the password against the reference password in the card, and transmitting authentication data of the user if the password and the reference password match in the checking step.

4. An authentication method in a communication system for identifying with a card a user of the card, comprising:

storing a plurality of correspondence tables in the card, wherein one of the plurality of correspondence tables to be used can be changed;

storing in the card a reference password which is formed by converting biometrics of an authorized user using the one of the plurality of correspondence tables in the card;

reading with the card biometrics of the user of the card using power supplied by communication between the card and a terminal;

converting the biometrics of the user into a password using the one of the plurality of correspondence tables in the card;

checking the password against the reference password in the card, and transmitting authentication data of the user to the terminal if the password and the reference password match in the checking step.

5. An authentication method in a communication system in which a server identifies with a card a user of the card, comprising:

storing a plurality of correspondence tables in the card, wherein one of the plurality of correspondence tables to be used can be changed;

storing in the card a reference password which is formed by converting biometrics of an authorized user using the one of the plurality of correspondence tables in the card;

reading with the card biometrics of the user of the card using power supplied by communication between the card and a terminal;
converting the biometrics of the user into a password using the one of the plurality of correspondence tables in the card;
checking the password against the reference password in the card; and
transmitting authentication data of the user to the terminal if the password and the reference password match in the checking step,
wherein after the authentication data of the user is received by the terminal, communication between the user and the server starts through the terminal.

6. An authentication method in a communication system for identifying with a card a user of the card, comprising:
storing a plurality of correspondence tables in the card, wherein one of the plurality of correspondence tables to be used can be changed;
storing in the card a reference password which is formed by converting biometrics of an authorized user using the one of the plurality of correspondence tables in the card;
reading with the card biometrics of the user of the card;
converting the biometrics of the user into a password using the one of the plurality of correspondence tables in the card; and
checking the password against the reference password in the card,
wherein the card does not transmit authentication data of the user if the password and the reference password do not match in the checking step.

7. An authentication method in a communication system for identifying with a card a user of the card, comprising:
storing a plurality of correspondence tables in the card, wherein one of the plurality of correspondence tables to be used can be changed;
storing in the card a reference password which is formed by converting biometrics of an authorized user using the one of the plurality of correspondence tables in the card;
reading with the card biometrics of the user of the card using power supplied by communication between the card and a terminal;
converting the biometrics of the user into a password using the one of the plurality of correspondence tables in the card; and
checking the password against the reference password in the card,
wherein the card does not transmit authentication data of the user to the terminal if the password and the reference password do not match in the checking step.

8. The authentication method according to any one of claims 1 to 7, wherein the step of reading biometrics of the user is conducted by a sensor provided in the card.

9. A communication system comprising:
a terminal;
a management server; and
an authentication card having a function of distinguishing a user,
wherein the authentication card comprises:
a sensor for reading biometrics of the user,
a function of storing a plurality of correspondence tables for converting the biometrics read by the sensor into a password, wherein one of the plurality of correspondence tables to be used can be changed,
a function of forming the password from the biometrics read by the sensor with reference to the one of the plurality of correspondence tables,
a function of storing a password which is formed from biometrics of an authorized user as a reference password by the function of forming the password,
a function of checking the password against the reference password, and
a function of wirelessly transmitting information to the terminal which is connected to the management server.

10. An authentication card which has a function of identifying a user, comprising:
a sensor for reading biometrics of the user,
a function of storing a plurality of correspondence tables for converting the biometrics read by the sensor into a password, wherein one of the plurality of correspondence tables to be used can be changed,
a function of forming the password from the biometrics read by the sensor with reference to the one of the plurality of correspondence tables,
a function of storing a password as a reference password which is formed from biometrics of an authorized user by the function of forming the password,
a function of checking the password against the reference password, and
a function of wirelessly transmitting information.

11. The communication system according to claim 9, wherein an authentication-complete signal is transmitted from the authentication card to the management server through the terminal if the password and the reference password match in the step of checking.

12. The communication system according to claim 9, wherein an authentication-incomplete signal is transmitted from the authentication card to the management server through the terminal if the password and the reference password do not match in the step of checking.

13. The method according to any one of claims 1 to 7, wherein information obtained from a hand is used as the biometrics.

14. The method according to any one of claims 1 to 7, wherein information obtained from a fingerprint is used as the biometrics.

15. The authentication card according to claim 10, wherein information can be transmitted wirelessly if the password and the reference password match in the step of checking.

16. The authentication card according to claim 10, wherein information cannot be transmitted wirelessly if the password and the reference password do not match in the step of checking.

* * * * *